(12) United States Patent
Maeno et al.

(10) Patent No.: US 7,299,414 B2
(45) Date of Patent: Nov. 20, 2007

(54) INFORMATION PROCESSING APPARATUS AND METHOD FOR BROWSING AN ELECTRONIC PUBLICATION IN DIFFERENT DISPLAY FORMATS SELECTED BY A USER

(75) Inventors: Tamaki Maeno, Kanagawa (JP); Yoshie Yanatsubo, Kanagawa (JP)

(73) Assignee: Sony Corporation (JP)

( * ) Notice: Subject to any disclaimer, the term of this patent is extended or adjusted under 35 U.S.C. 154(b) by 449 days.

(21) Appl. No.: 10/235,077

(22) Filed: Sep. 5, 2002

(65) Prior Publication Data

US 2003/0058272 A1 Mar. 27, 2003

(30) Foreign Application Priority Data

Sep. 19, 2001 (JP) ............................ P2001-284718

(51) Int. Cl.
*G06F 15/00* (2006.01)
*G06F 17/00* (2006.01)

(52) U.S. Cl. ...................... 715/536; 715/526; 715/523; 715/513

(58) Field of Classification Search ................ 715/526, 715/513, 536, 523
See application file for complete search history.

(56) References Cited

U.S. PATENT DOCUMENTS

| | | | | |
|---|---|---|---|---|
| 5,848,386 A | * | 12/1998 | Motoyama | 704/5 |
| 5,987,403 A | * | 11/1999 | Sugimura | 704/2 |
| 6,055,544 A | * | 4/2000 | DeRose et al. | 707/104.1 |
| 6,088,675 A | * | 7/2000 | MacKenty et al. | 704/270 |
| 6,119,078 A | * | 9/2000 | Kobayakawa et al. | 704/3 |
| 6,208,956 B1 | * | 3/2001 | Motoyama | 704/2 |
| 6,289,358 B1 | * | 9/2001 | Mattis et al. | 707/203 |
| 6,330,529 B1 | * | 12/2001 | Ito | 704/3 |
| 6,336,124 B1 | * | 1/2002 | Alam et al. | 715/523 |
| 6,349,275 B1 | * | 2/2002 | Schumacher et al. | 704/8 |
| 6,385,568 B1 | * | 5/2002 | Brandon et al. | 704/7 |
| 6,426,798 B1 | * | 7/2002 | Yeung | 358/1.13 |
| 6,470,306 B1 | * | 10/2002 | Pringle et al. | 704/3 |
| 6,559,861 B1 | * | 5/2003 | Kennelly et al. | 715/703 |
| 6,691,279 B2 | * | 2/2004 | Yoden et al. | 715/501.1 |
| 6,789,057 B1 | * | 9/2004 | Morimoto et al. | 704/2 |
| 2001/0018649 A1 | * | 8/2001 | Kasai et al. | 704/3 |

(Continued)

OTHER PUBLICATIONS

Garofalakis, Minos, et al., "XTRACT: A System for Extracting Document Type Descriptors from XML Documents", MOD 2000, Dallas, TX, May 2000, pp. 165-176 [ACM 1-58113-218-2/00/05], (plus citation page).*

(Continued)

*Primary Examiner*—Shahid Alam
*Assistant Examiner*—Robert Stevens
(74) *Attorney, Agent, or Firm*—Lerner, David, Littenberg, Krumholz & Mentlik, LLP

(57) ABSTRACT

An formation processing apparatus that performs language translations, wherein content data includes text data having the same meaning, written in a plurality of languages, and enclosed by <Multi> and </Multi>. Text data written in each language is enclosed by <Phrase lang="language attribute"> and </Phrase>. When text data is written in two languages, English and Japanese, the language attributes are "en" for English and "ja" for Japanese. A display apparatus extracts text data written in a desired language(s) from the content data by referring to the language attribute, to display the data in various display methods.

17 Claims, 26 Drawing Sheets

U.S. PATENT DOCUMENTS

| | | | |
|---|---|---|---|
| 2001/0029455 A1* | 10/2001 | Chin et al. | 704/277 |
| 2002/0019839 A1* | 2/2002 | Shiu | 707/536 |
| 2002/0026475 A1* | 2/2002 | Marmor | 709/203 |
| 2002/0040359 A1* | 4/2002 | Green et al. | 707/3 |
| 2002/0073165 A1* | 6/2002 | McNulty et al. | 709/217 |
| 2002/0143816 A1* | 10/2002 | Geiger et al. | 707/513 |
| 2003/0004874 A1* | 1/2003 | Ludwig et al. | 705/40 |
| 2003/0005159 A1* | 1/2003 | Kumhyr | 709/246 |
| 2003/0037069 A1* | 2/2003 | Davison | 707/200 |
| 2003/0040899 A1* | 2/2003 | Ogilvie | 704/2 |
| 2003/0167162 A1* | 9/2003 | Simpson et al. | 704/9 |
| 2004/0205452 A1* | 10/2004 | Fitzsimons et al. | 715/500 |
| 2004/0205671 A1* | 10/2004 | Sukehiro et al. | 715/532 |

OTHER PUBLICATIONS

Chamberlin, Donald D., et al., "JANUS: An Interactive System for Document Composition", IBM Research Laboratory, San Jose, CA, © 1981, pp. 82-91 [ACM 0-89791-050-8/81/0600/0082].*

Vaughan-Nichols, Steven, et al., Inside the World Wide Web, New Riders Publishing, Indianapolis, IN, © 1995, pp. 543, 591-600, 644, 679, 766-767, 820, 832-833, 844, and 955.*

* cited by examiner

FIG. 1A

```
I take his hand.

I take the pencil.
```
~1

FIG. 1B

```
<P> I take his hand. </P>
<P>                  </P>
<P> I take the pencil. </P>
<P>                  </P>
```

```
<P refid="23" action="click" show="popup">
I take his hand. </P>
<P refid="24" action="click" show="popup">
I take the pencil. </P>
```

```
            ⋮
<P id="23">                      </P>
<P id="24">                      </P>
            ⋮
```

⋮

<Multi>

<Phrase lang="en"> I take his hand. </ Phrase>

<Phrase lang="ja"> </ Phrase>

</Multi>

<Multi>

<Phrase lang="en"> I take the pencil. </ Phrase>

<Phrase lang="ja"> </ Phrase>

</Multi>

| XXXX | I take his hand. |
| XXXX | I take the pencil. |
| XXXX | |

ADDRESS — DATA TO BE DISPLAYED

FIG. 12

\<Multi\>
\<Phrase lang="en"\> I take his hand. \</ Phrase\>
\<Phrase lang="ja"\>                    \</ Phrase\>
\<Phrase lang="de"\>                            \</ Phrase\>
\</Multi\>
\<Multi\>
\<Phrase lang="en"\> I take the pencil. \</ Phrase\>
\<Phrase lang="ja" \>                    \</ Phrase\>
\<Phrase lang="de"\>                            \</ Phrase\>
\</Multi\>

FIG. 15

| ADDRESS | Continuity bit | DATA TO BE DISPLAYED IN LEFT-HAND DISPLAY AREA 142-1 | Continuity bit | DATA TO BE DISPLAYED IN RIGHT-HAND DISPLAY AREA 142-2 |
|---|---|---|---|---|
| XXXX | 1 | ① I take his hand. | 1 | ① |
| XXXX | 0 | | 1 | |
| XXXX | 1 | ② I take the pencil. | 1 | ② |
| XXXX | 0 | | 1 | |

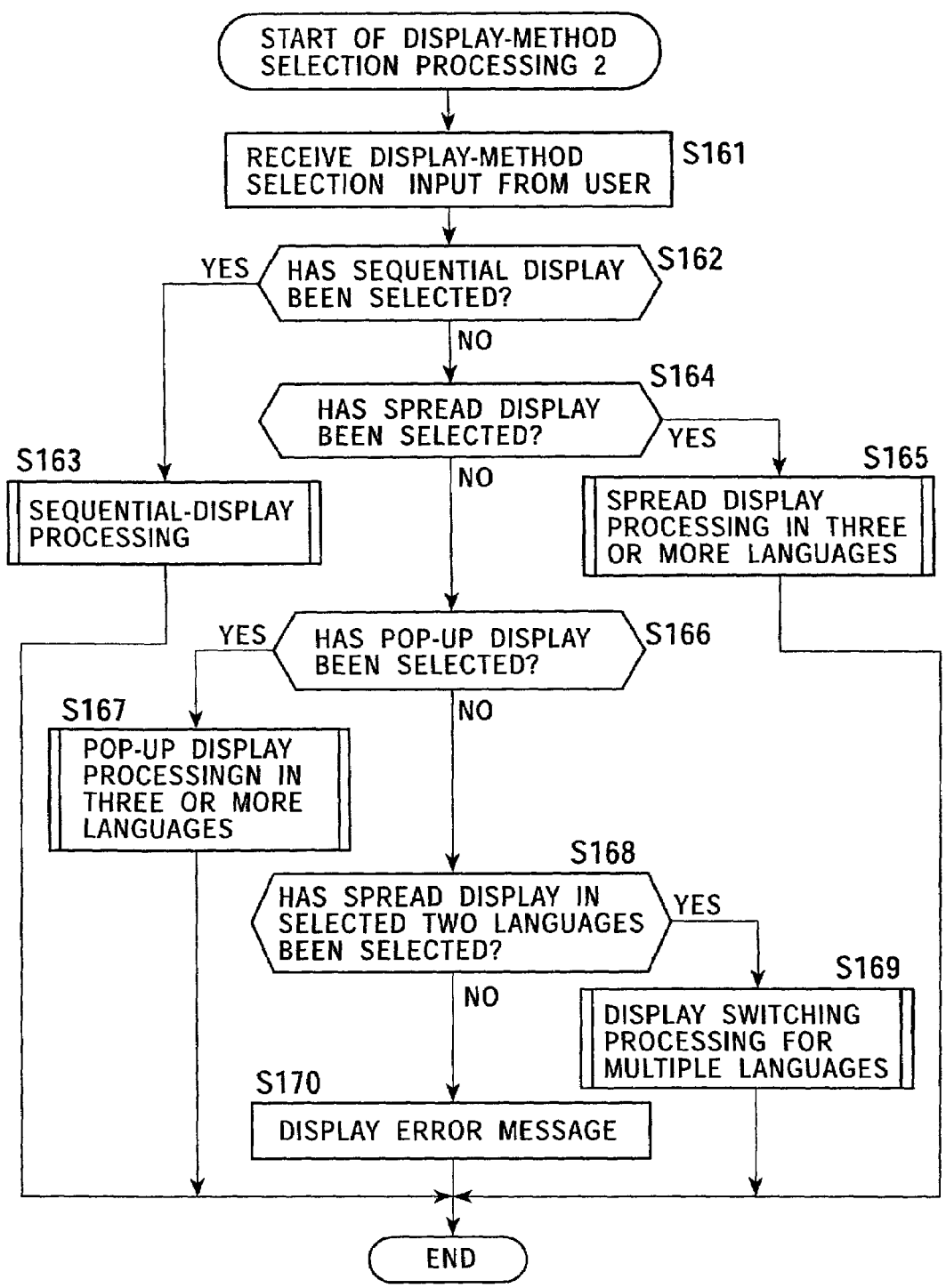

INFORMATION PROCESSING APPARATUS AND METHOD FOR BROWSING AN ELECTRONIC PUBLICATION IN DIFFERENT DISPLAY FORMATS SELECTED BY A USER

BACKGROUND OF THE INVENTION

1. Field of the Invention

The present invention relates to information processing apparatuses, information processing methods, recording media, data structures, and programs, and more particularly, to an information processing apparatus, an information processing method, a recording medium, a data structure, and a program suited for browsing electronic publications.

2. Description of the Related Art

Paper has been conventionally used as a main medium for publishing publications, such as newspapers and magazines. As computers have advanced, their usage has been expanded, and many networks have been made, publishing with media other than paper, that is, electronic publishing, has been spread.

Electronic publishing is especially suited for publishing publications having a huge amount of information, such as dictionaries, encyclopedias, and illustrated reference books. For example, one compact disk read only memory (CD-ROM) can store an encyclopedia of about 30 volumes. Dictionaries and encyclopedias which have been published by paper are converted to digital forms, and not only texts and images but sound and moving images are stored in a predetermined storage medium, or in a storage section included in a personal computer or a predetermined reproduction apparatus at its inside. The user uses the personal computer or the predetermined reproduction apparatus in which, for example, dictionary data has been stored or into which a recording medium that has stored dictionary data has been loaded to input a desired item to search for the information and to reproduce the data.

As the Internet has been rapidly spread, on-line dictionaries have also been spread in which data is stored in a server and the user can use through the Internet. In addition, since recording media have been made compact and have had a large capacity, compact electronic dictionaries have also been used widely.

FIG. 1A shows an example display screen of a sentence-equivalent dictionary. In the display screen 1, the body of the sentence-equivalent dictionary is displayed in the same format as in the paper version of the dictionary. A scroll bar (not shown) can be operated to scroll the screen to see the data described before and after the data being displayed, in the same way as turning the pages of the paper version of the dictionary.

FIG. 1B shows the data of the portion displayed in the display screen 1 shown in FIG. 1A. In the data shown in FIG. 1B, each text data displayed on the display screen 1 is enclosed by <P> and </P> and described (in a paragraph). The data corresponding to the display screen 1 may include data indicating the color and size of characters or the type of fonts, but such data is not shown in the figure.

When the same data as that shown in FIG. 1A is used to generate an electronic publication in which a pop-up window 7 is displayed if a predetermined operation is executed such as moving a cursor 6 to text data shown on a display screen 5 or moving the cursor 6 and clicking, as shown in FIG. 2A, it is necessary to generate data shown in FIG. 2B corresponding to the data displayed in FIG. 2A.

As shown in FIG. 2B, the text data displayed on the display screen 5 is not only paragraphed by <P> and </P> but has a refid attribute, an action attribute, and a show attribute. More specifically, in the electronic publication shown in FIG. 2A, when the operation input specified by the action attribute of a predetermined text is received, the text data described at another portion, specified by a predetermined ID is referenced, and the pop-up window 7 in which the referenced text data is written is displayed. When the cursor 6 is moved such that it is on the text data of "I take his hand." and a click operation is executed on the display screen 5 shown in FIG. 2A, for example, the pop-up window 7 in which the text data indicated by id="23" is described is displayed. When the cursor 6 is moved such that it is on the text data of "I take the pencil." and a click operation is executed on the display screen 5 shown in FIG. 2A, the pop-up window 7 in which the text data indicated by id="24" is described is displayed.

FIG. 2C shows the data referenced by the data shown in FIG. 2B. Since Japanese text data of "私は彼の手を取る。" is indicated by id="23," when the cursor 6 is moved such that it is on the text data of "I take his hand." and a click operation is executed on the display screen 5, the Japanese text data is described on the pop-up window 7 and displayed. Since Japanese text data of "私は鉛筆をつかむ。" is indicated by id="24," when the cursor 6 is moved such that it is on the text data of "I take the pencil." and a click operation is executed on the display screen 5, the Japanese text data is described on the pop-up window 7 and displayed.

In summary, in conventional electronic publications, even when the original information is exactly the same, it is necessary to generate completely different data depending on display methods, as described by referring to FIG. 1A and FIG. 2C.

SUMMARY OF THE INVENTION

The present invention has been made in consideration of the above-described situation. An object of the present invention is to provide an electronic publication which can be shown in a plurality of display methods with common content data being used.

The foregoing object is achieved in one aspect of the present invention through the provision of an information processing apparatus including input means for receiving a user's operation input; acquisition means for acquiring first information; extraction means for extracting a part from the first information acquired by the acquisition means, according to the user's operation input by the input means; first detection means for detecting second information included in the first information extracted by the extraction means; classification means for classifying the first information extracted by the extraction means, according to the second information detected by the first detection means to generate a plurality of pieces of third information; calculation means for calculating the number of display lines required to display each of the plurality of pieces of third information; generation means for determining the display position of each of the plurality of pieces of third information according to the calculation results of the calculation means such that a piece of the third information having the largest number of display lines can fit, to generate fourth information used for display; save means for saving the fourth information generated by the generation means; and display means for displaying the fourth information saved by the save means.

The information processing apparatus may be configured such that it further includes second detection means for detecting fifth information indicating the save position of a portion of the first information, corresponding to the fourth information, and the save means further saves the fifth information detected by the second detection means.

The generation means may generate the fourth information which includes sixth information indicating whether the corresponding line is a blank line or not.

The generation means may change any of the plurality of pieces of third information included in the fourth information to generate new fourth information by referring to the sixth information included in the current fourth information saved by the save means.

The information processing apparatus may be configured such that the second information indicates the type of a language used for text data included in the first information, and the classification means classifies the text data by the type of the language according to the second information to generate the plurality of pieces of third information.

The first information may be written in a markup language.

The foregoing object is achieved in another aspect of the present invention through the provision of an information processing method including an input control step of controlling the input of a user's operation; an acquisition control step of controlling the acquisition of first information; an extraction step of extracting a part from the first information of which the acquisition is controlled by the process of the acquisition control step, according to the user's operation of which the input is controlled by the process of the input control step; a detection step of detecting second information included in the first information extracted by the process of the extraction step; a classification step of classifying the first information extracted by the process of the extraction step, according to the second information detected by the process of the detection step to generate a plurality of pieces of third information; a calculation step of calculating the number of display lines required to display each of the plurality of pieces of third information; a generation step of determining the display position of each of the plurality of pieces of third information according to the calculation results obtained by the process of the calculation step such that a piece of the third information having the largest number of display lines can fit, to generate fourth information used for display; a save control step of controlling the save operation of the fourth information generated by the process of the generation step; and a display control step of controlling the display of the fourth information of which the save operation is controlled by the process of the save control step.

The foregoing object is achieved in yet another aspect of the present invention through the provision of a recording medium storing a computer-readable program, the program including an input control step of controlling the input of a user's operation; an acquisition control step of controlling the acquisition of first information; an extraction step of extracting a part from the first information of which the acquisition is controlled by the process of the acquisition control step, according to the user's operation of which the input is controlled by the process of the input control step; a detection step of detecting second information included in the first information extracted by the process of the extraction step; a classification step of classifying the first information extracted by the process of the extraction step, according to the second information detected by the process of the detection step to generate a plurality of pieces of third information; a calculation step of calculating the number of display lines required to display each of the plurality of pieces of third information; a generation step of determining the display position of each of the plurality of pieces of third information according to the calculation results obtained by the process of the calculation step such that a piece of the third information having the largest number of display lines can fit, to generate fourth information used for display; a save control step of controlling the save operation of the fourth information generated by the process of the generation step; and a display control step of controlling the display of the fourth information of which the save operation is controlled by the process of the save control step.

The foregoing object is achieved in still another aspect of the present invention through the provision of a program including an input control step of controlling the input of a user's operation; an acquisition control step of controlling the acquisition of first information; an extraction step of extracting a part from the first information of which the acquisition is controlled by the process of the acquisition control step, according to the user's operation of which the input is controlled by the process of the input control step; a detection step of detecting second information included in the first information extracted by the process of the extraction step; a classification step of classifying the first information extracted by the process of the extraction step, according to the second information detected by the process of the detection step to generate a plurality of pieces of third information; a calculation step of calculating the number of display lines required to display each of the plurality of pieces of third information; a generation step of determining the display position of each of the plurality of pieces of third information according to the calculation results obtained by the process of the calculation step such that a piece of the third information having the largest number of display lines can fit, to generate fourth information used for display; a save control step of controlling the save operation of the fourth information generated by the process of the generation step; and a display control step of controlling the display of the fourth information of which the save operation is controlled by the process of the save control step.

According to the information processing apparatus, the information processing method, and the program of the present invention, a user's operation input is received, first information is obtained, a part of the obtained first information is extracted according to the input user's operation, second information included in the extracted first information is detected, the extracted first information is classified according to the detected second information to generate a plurality of pieces of third information, the number of display lines of each of the plurality of pieces of third information is calculated, the display position of each of the plurality of pieces of third information is determined according to the calculation results such that a piece of third information having the largest number of display lines can fit, fourth information for display is generated, the generated fourth information is saved, and the saved fourth information is displayed. Therefore, data can be classified and displayed according to information such as the attribute of a language.

The foregoing object is achieved in still yet another aspect of the present invention through the provision of an information processing apparatus including input means for receiving a user's operation input; acquisition means for acquiring first information; first extraction means for extracting a part from the first information acquired by the acquisition means, according to the user's operation input by the input means; first detection means for detecting second information included in the first information extracted by the first extraction means; second extraction means for extracting third information from the first information extracted by the first extraction means, according to the second information detected by the first detection means; generation means for generating display data according to the third information; and display means for displaying the display data generated by the generation means, wherein the third information extracted by the second extraction means includes text data having the same meaning and written in a plurality of languages.

The information processing apparatus may be configured such that the second extraction means extracts a plurality of pieces of third information, and the generation means generates the display data such that the plurality of pieces of third information extracted by the second extraction means can be distinguished.

The information processing apparatus may be configured such that it further includes second detection means for detecting fourth information indicating the attributes of the languages of the text data included in the third information extracted by the second extraction means; and third extraction means for extracting only text data written in a predetermined language, according to the fourth information detected by the second detection means, and the generation means generates first display data formed of the text data written in the predetermined language extracted by the third extraction means and second display data formed of text data written in a language other than the predetermined language, and the display means displays a first display screen corresponding to the first display data, and, when the input means inputs an operation for selecting a predetermined text displayed on the first display screen, displays a second display screen corresponding to the second display data corresponding to the predetermined text.

The first information may be written in a markup language.

The foregoing object is achieved in a further aspect of the present invention through the provision of an information processing method including an input control step of controlling the input of a user's operation; an acquisition control step of controlling the acquisition of first information; a first extraction step of extracting a part from the first information of which the acquisition is controlled by the process of the acquisition control step, according to the user's operation of which the input is controlled by the process of the input control step; a detection step of detecting second information included in the first information extracted by the process of the first extraction step; a second extraction step of extracting third information from the first information extracted by the process of the first extraction step, according to the second information detected by the process of the detection step; a generation step of generating display data according to the third information; and a display control step of controlling the display of the display data generated by the process of the generation step, wherein the third information extracted by the process of the second extraction step includes text data having the same meaning and written in a plurality of languages.

The foregoing object is achieved in a still further aspect of the present invention through the provision of a recording medium storing a computer-readable program, the program including an input control step of controlling the input of a user's operation; an acquisition control step of controlling the acquisition of first information; a first extraction step of extracting a part from the first information of which the acquisition is controlled by the process of the acquisition control step, according to the user's operation of which the input is controlled by the process of the input control step; a detection step of detecting second information included in the first information extracted by the process of the first extraction step; a second extraction step of extracting third information from the first information extracted by the process of the first extraction step, according to the second information detected by the process of the detection step; a generation step of generating display data according to the third information; and a display control step of controlling the display of the display data generated by the process of the generation step, wherein the third information extracted by the process of the second extraction step includes text data having the same meaning and written in a plurality of languages.

The foregoing object is achieved in a yet further aspect of the present invention through the provision of a program including an input control step of controlling the input of a user's operation; an acquisition control step of controlling the acquisition of first information; a first extraction step of extracting a part from the first information of which the acquisition is controlled by the process of the acquisition control step, according to the user's operation of which the input is controlled by the process of the input control step; a detection step of detecting second information included in the first information extracted by the process of the first extraction step; a second extraction step of extracting third information from the first information extracted by the process of the first extraction step, according to the second information detected by the process of the detection step; a generation step of generating display data according to the third information; and a display control step of controlling the display of the display data generated by the process of the generation step, wherein the third information extracted by the process of the second extraction step includes text data having the same meaning and written in a plurality of languages.

According to the information processing apparatus, the information processing method, and the program of the present invention, a user's operation input is received, first information is obtained, a part of the obtained first information is extracted according to the input user's operation, second information included in the extracted first information is detected, third information is extracted from the extracted first information according to the detected second information, display data is generated according to the third information, the generated display data is displayed, and the extracted third information includes text data having the same meaning and written in a plurality of languages. Therefore, data for displaying a display screen easy to understood by the user can be generated and displayed according to information having corresponding meanings.

The foregoing object is achieved in a still yet further aspect of the present invention through the provision of a data structure including at least one piece of first information which includes text data having the same meaning and written in a plurality of languages; second information indicating the attribute of each language, the second information being associated with the text data written in the plurality of languages, included in the first information; third information for specifying the start position of the first information; and fourth information for specifying the end position of the first information.

According to the data structure of the present invention, at least one piece of first information which includes text data having the same meaning and written in a plurality of languages is included, second information indicating the attribute of each language is associated with the text data written in the plurality of languages, included in the first information, third information specifies the start position of the first information, and fourth information specifies the end position of the first information. Therefore, one piece of information can be displayed in various ways, and information which includes text data having the same meaning and written in a plurality of languages can be provided as a content file in a format in which data written in a desired language can be easily extracted.

BRIEF DESCRIPTION OF THE DRAWINGS

FIG. 1A and FIG. 1B are views showing the display screen of a conventional sentence-equivalent dictionary and the corresponding data.

FIG. 9A to FIG. 9D are views showing display methods for the content data shown in FIG. 8.

FIG. 11 is a view showing data buffered in a text display buffer.

FIG. 12 is a view showing content data written in three languages.

FIG. 15 is a view showing data buffered in the text display buffer.

FIG. 27 is a flowchart of display-method selection processing 2.

DESCRIPTION OF THE PREFERRED EMBODIMENTS

Figures 2A, 2B, 2C:
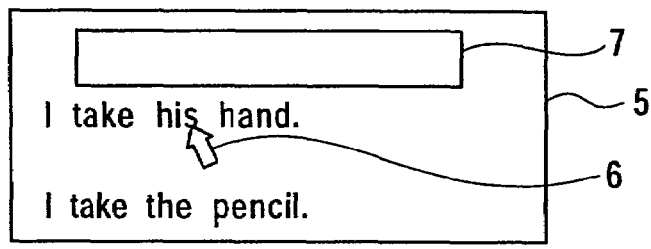
FIG. 2A to FIG. 2C are views showing a pop-up display screen generated by using the same data as in the sentence-equivalent dictionary shown in FIG. 1, and the corresponding data.

Embodiments of the present invention will be described by referring to the drawings.

An electronic-publication providing system according to the present invention will be described by referring to FIG. 3.

A content data base 11 records content data used for displaying electronic publications and object data related to the contents in a predetermined file format.

The content data includes not only information reproduced or displayed as electronic publications and described in a markup language, such as an extensible markup language (XML), but instructions for reproducing or displaying the electronic publications and, as required, other content data or instructions for referring to the object data. XML is a markup language in which a fixed markup method can be used as in a hypertext markup language (HTML) and in addition, a unique markup method can be defined. XML can describe a document structure in a simple format. Since special tags can be defined, data is described in a structure easy-to-understood by the users by using XML. Flexible data arrangement is possible.

The object data is data which does not include an instruction, such as plain text data, image data, audio data, and moving-image data. The object data is reproduced or displayed when it is referred to by the content.

A personal computer 12 reads content data described in XML or object data from the content data base 11, and outputs and records the content data constituting an electronic publication or the object data to and into various recording media, such as a magnetic disk 14, an optical disk 15, a magneto-optical disk 16, and a semiconductor memory 17 (including Memory Stick (trademark)), or an internal memory of an electronic-book player 18, which is a special reproduction apparatus.

The personal computer 12 also makes, for example, a PDA 21 owned by the user or a personal computer 22 download the content data or the object data through the Internet 20.

In the figure, one unit of the personal computer 12 is shown. A plurality of personal computers 12 may be disposed. Even if there are a plurality of electronic-publishing companies, a personal computer managed by each of the companies is connected to the Internet 20.

The various recording media, such as the magnetic disk 14, the optical disk 15, the magneto-optical disk 16, and the semiconductor memory 17, are loaded to the PDA 21 owned by the user, the personal computer 22, or the electronic-book player 18.

The PDA 21 or the personal computer 22 displays on a display apparatus, such as a display unit or a touch-sensitive panel, the electronic publication formed of the content data and object data downloaded from the personal computer 12 through the Internet 20 and recorded in the internal memory, or the content data and object data recorded in the loaded recording medium, such as the magnetic disk 14, the optical disk 15, the magneto-optical disk 16, or the semiconductor memory 17.

The electronic-book player 18 displays on a display panel the electronic publication formed of the content data and object data recorded in its inside in advance or recorded in its inside by the user's processing, or the content data and object data recorded in the loaded recording medium. The electronic-book player 18 can also download content data and object data from the personal computer 12 through the Internet.

Figure 3:
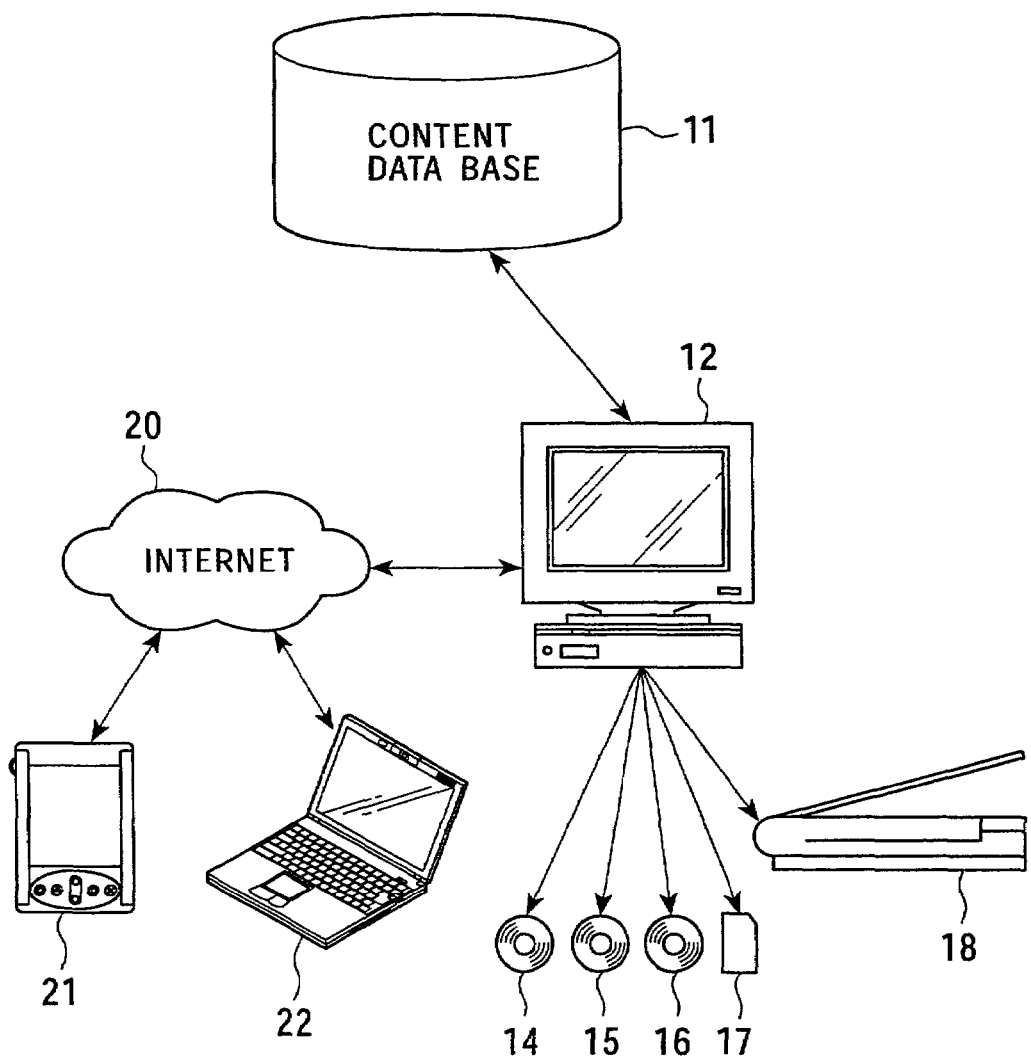
FIG. 3 is a view showing an electronic-publication providing system according to the present invention.
Figure 4:
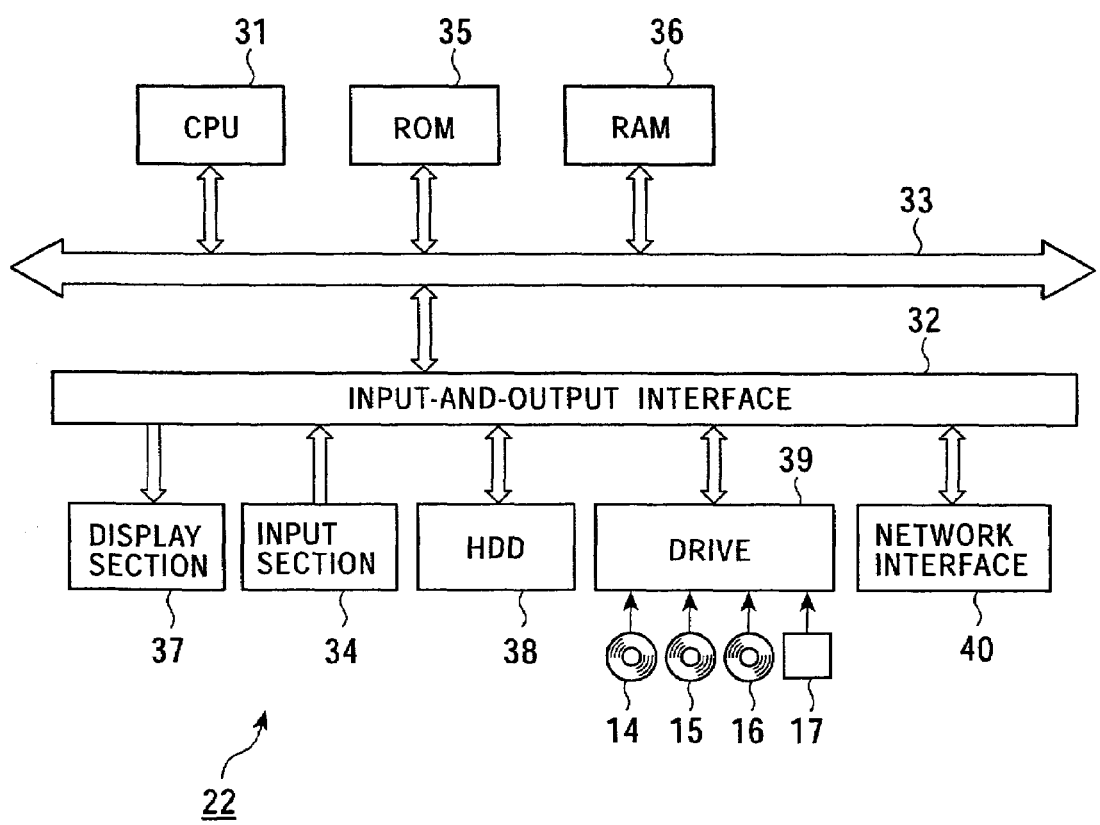
FIG. 4 is a block diagram showing the structure of a personal computer shown in FIG. 3.

FIG. 4 is a block diagram of the personal computer 22 shown in FIG. 3.

A central processing unit (CPU) 31 receives the signals corresponding to various instructions input by the user from an input section 34 through an input-and-output interface 32 and an internal bus 33, or a control signal sent from another personal computer (for example, the personal computer 22) through a network interface 40, and executes various types of processing according to the input signals. A read only memory 35 (ROM) stores a program used by the CPU 31 and basically fixed data among calculation parameters. A random access memory (RAM) 36 stores a program used by the CPU 31 and parameters which are changed as required during the execution of the program. The CPU 31, the ROM 35, and the RAM 36 are connected to each other through the internal bus 33.

The internal bus 33 is also connected to the input-and-output interface 32. The input section 34 is formed, for example, of a keyboard, a touch-sensitive pad, a jog dial, or a mouse, and is operated when the user inputs various instructions to the CPU 31. A display section 37 is formed, for example, of a cathode ray tube (CRT) or a liquid-crystal display apparatus, and displays various pieces of information by text or by images.

A hard disk drive (HDD) 38 drives a hard disk and records or reproduces a program executed by the CPU 31 and information into or from the hard disk. A magnetic disk 14, an optical disk 15, a magneto-optical disk 16, or a semiconductor memory 17 is loaded to a drive 39, if necessary, and data is transferred thereto or therefrom.

The network interface 40 is connected to the Internet 20, for example, through a public telephone line to download the content data of a desired electronic publication from the personal computer 12 and transfers information to and from another unit through a predetermined cable.

The input section 34, the display section 37, the hard disk drive 38, the drive 39, and the network interface 40 are connected to the CPU 31 through the input-and-output interface 32 and the internal bus 33.

Since the structure of the personal computer 12 shown in FIG. 3 is basically the same as that of the personal computer 22 described by referring to FIG. 4, a description thereof is omitted.

Figure 5:
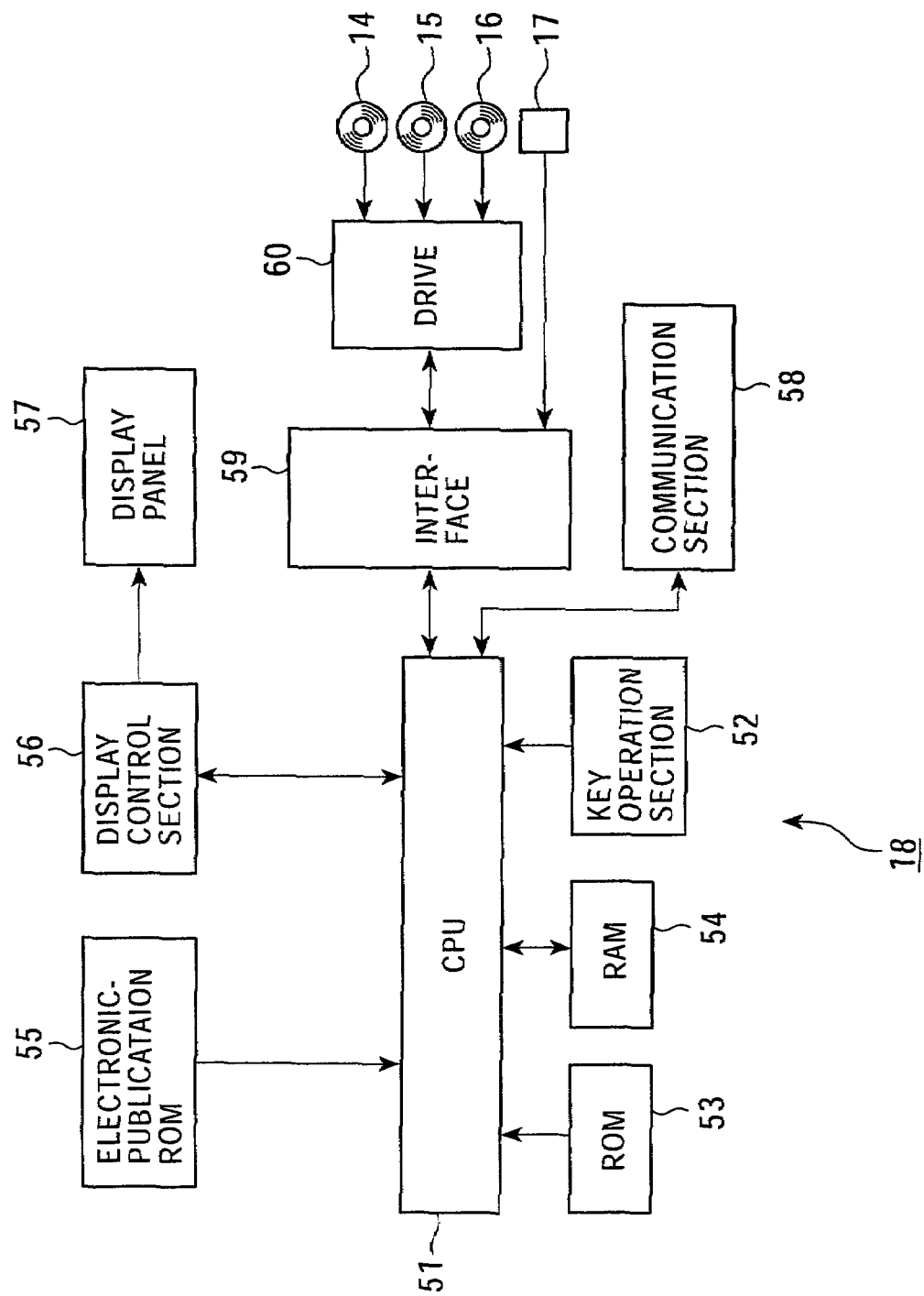
FIG. 5 is a block diagram showing the structure of an electronic-book player shown in FIG. 3.

FIG. 5 is a block diagram of the electronic-book player 18 shown in FIG. 3.

A central processing unit (CPU) 51 executes various types of processing according to the signals corresponding to various instructions input by the user from a key operation section 52 and a control signal input through a communication section 58. A read only memory 53 (ROM) stores a program used by the CPU 51 and basically fixed data among calculation parameters. A random access memory (RAM) 54 stores a program used by the CPU 51 and parameters which are changed as required during the execution of the program.

An electronic-publication ROM 55 records the data (content data and object data) of an electronic publication input from the personal computer 12 or downloaded from the personal computer 12 through the Internet 20 and the communication section 58.

A display control section 56 displays various pieces of information by text or by images on a display panel 57 under the control of the CPU 51. The display panel 57 is formed, for example, of a liquid-crystal display apparatus, and displays various pieces of information by text or by images under the control of the display control section 56.

A drive 60 and a semiconductor memory 17 are connected to an interface 59 for data transfer. A magnetic disk 14, an optical disk 15, or a magneto-optical disk 16 is loaded to the drive 60, if necessary, and data is transferred thereto or therefrom.

The communication section 58 is connected to the personal computer 12 with a predetermined cable to transfer information thereto and therefrom, and accesses the personal computer 12 through the Internet 20 to search for necessary information and to download it from the personal computer 12.

The internal structure of the PDA 21 will be described next by referring to FIG. 6.

A central processing unit (CPU) 71 executes various types of programs, such as an operating system and a developed application program stored in a flash read only memory (ROM) 73 or an extended-data-out dynamic random access memory (EDO DRAM) 74, in synchronization with a clock signal sent from an oscillator 72.

The flash ROM 73 is one of electrically erasable programmable read only memories (EEPROMs), and stores a program used by the CPU 71 and basically fixed data among calculation parameters. The EDO DRAM 74 stores a program used by the CPU 71 and parameters which are changed as required during the execution of the program.

A Memory-Stick interface 75 reads data from a Memory Stick 91 loaded into the PDA 21, and writes data sent from the CPU 71 into the Memory Stick 91.

A universal serial bus (USB) interface 76 receives data or a program from a drive 83 which is a USB unit connected thereto and sends data sent from the CPU 71 to the drive 83, in synchronization with a clock signal sent from an oscillator 77. The USB interface 76 also receives data or a program from a cradle 84 which is a USB unit connected thereto and sends data sent from the CPU 71 to the cradle 84, in synchronization with the clock signal sent from the oscillator 77.

The cradle 84 is a docking station for connecting the PDA 21 and the personal computer with wire, and for executing data synchronization by a so-called hot sync process.

The drive 83 is also connected to the USB interface 76. The drive 83 reads data or a program recorded in a magnetic disk 14, an optical disk 15, a magneto-optical disk 16 or a semiconductor memory 17 loaded into the drive 83, and sends the data or the program through the USB interface 76 to the CPU 71 or to the EDO DRAM 74 connected to the USB interface 76. The drive 83 also records data or a program sent from the CPU 71 into the magnetic disk 14, the optical disk 15, the magneto-optical disk 16 or the semiconductor memory 17 loaded into the drive 83.

The PDA 21 can also be connected to a mobile telephone and a personal handyphone system (PHS), and can access the personal computer 12 through the Internet 20.

The flash ROM 73, the EDO DRAM 74, the Memory-Stick interface 75, and the USB interface 76 are connected to the CPU 71 through an address bus and a data bus.

A display section 90 receives data from the CPU 71 through an LCD bus, and displays the image or characters corresponding to the received data. When a touch sensitive pad disposed at the upper portion of the display section 90 is operated, a touch-sensitive-pad control section 78 receives the data (for example, the coordinates of the touched point) corresponding to the operation from the display section 90, and sends the signal corresponding to the received data to the CPU 71 through a serial bus.

An electroluminescence (EL) driver 79 operates an electroluminescence device provided at the rear side of the liquid-crystal display part of the display section 90 to control display brightness in the display section 90.

An infrared-ray communication section 80 sends data received from the CPU 71 to other units (not shown) through a universal asynchronous receiver/transmitter (UART) by an infrared ray, and receives data from other units by an infrared ray and sends it to the CPU 71. In other words, the PDA 21 can communicate with other units through the UART.

An audio reproduction section 82 is formed of a speaker, an audio-data decoding circuit, and others, and decodes audio data stored in advance or audio data received through the Internet 20, reproduces it, and output the corresponding sound.

Keys 88 are formed, for example, of an input key and others, and are operated by the user to input various instructions to the CPU 71.

A jog dial 89 sends the data corresponding to a user's rotation operation applied to the jog dial 89 or a user's pressing operation applied to the jog dial 89 against the body side, to the CPU 71.

A power supply circuit 87 converts a power-supply voltage sent from a loaded battery 85 or a connected alternating current (AC) adaptor 86, and supplies power voltages to the CPU 71, the audio reproduction section 82, and others.

Figure 7:
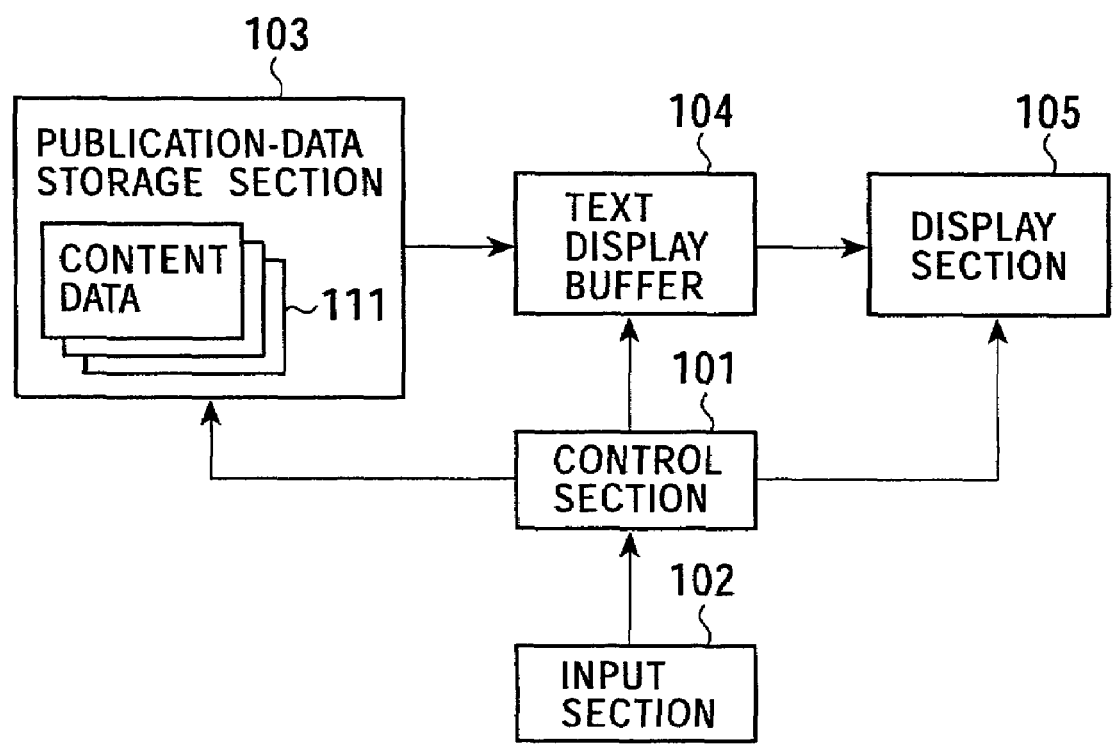
FIG. 7 is a view of functional blocks required to execute processing for displaying an electronic publication.

Functional blocks used when an electronic publication is reproduced by, for example, the electronic-book player 18, the PDA 21, or the personal computer 22 will be described next by referring to FIG. 7.

A control section 101 controls electronic-publication reproduction processing according to the signal indicating a user's operation input from an input section 102. The control section 101 controls a text display buffer 104 such that content data 111 stored in a publication-data storage section 103 is displayed on a display section 105.

Figure 6:
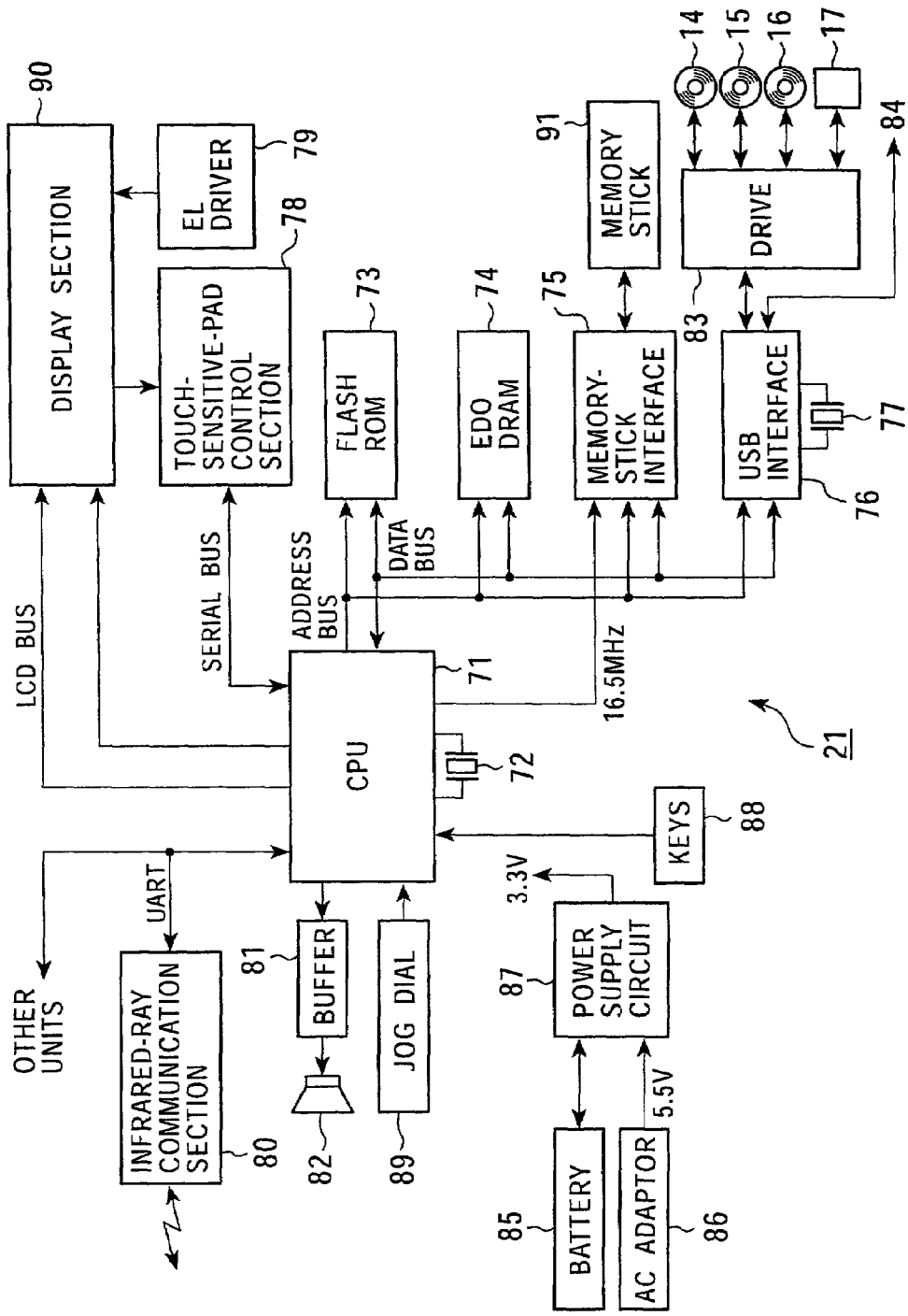
FIG. 6 is a block diagram showing the structure of a PDA shown in FIG. 3.

The input section 102 corresponds, for example, to the input section 34 of the personal computer 22 described by referring to FIG. 4, the key operation section 52 of the electronic-book player 18 described by referring to FIG. 5, the touch-sensitive-pad control section 78 of the PDA 21 described by referring to FIG. 6, or the jog dial 89, and receives an user's operation input and outputs the signal indicating the operation to the control section 101.

The publication-data storage section 103 corresponds, for example, to the HDD 38 of the personal computer 22 described by referring to FIG. 4, the electronic-publication ROM 55 of the electronic-book player 18 described by referring to FIG. 5, the EDO DRAM 74 of the PDA 21 described by referring to FIG. 6, the Memory Stick 91, or a recording medium, such as a magnetic disk 14, an optical disk 15, a magneto-optical disk 16, or a semiconductor memory 17 described by referring to FIG. 4 to FIG. 6. The publication-data storage section 103 records the content data of various electronic publications.

Under the control of the control section 101, the text display buffer 104 reads the data corresponding to a display part of the content data 111 to be reproduced, from the publication-data storage section 103, and buffers a text display table in which a display content for each line is associated with the address (relative address or absolute address) of the data corresponding to the top of the line. The control section 101 controls the text display buffer 104 so as to buffer data used for displaying in various display formats described later.

The display section 105 corresponds, for example, to the display section 37 of the personal computer 22 described by referring to FIG. 4, the display control section 56 and the display panel 57 of the electronic-book player 18 described by referring to FIG. 5, or the display section 90 of the PDA 21 described by referring to FIG. 6, and displays the text or the image corresponding to input data.

Figure 8:
FIG. 8 is a view showing content data.

FIG. 8 shows example content data 111.

As shown in FIG. 8, in the content data 111, text data written in multiple languages and having the same meaning is enclosed by <Multi> and </Multi>. Text data written in each language is enclosed by <Phrase lang="language attribute"> and </Phrase>. In FIG. 8, text data is written in two languages, English and Japanese, and the language attributes are "en" for English and "ja" for Japanese.

The content data 111 shown in FIG. 8 is displayed by a plurality of display methods. Example display methods will be described next by referring to FIG. 9A to FIG. 9D.

Figure 9A:
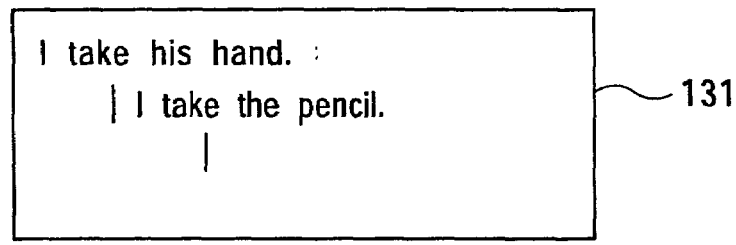

FIG. 9A shows a display screen 131 in which data written in two languages is sequentially displayed. In sequential display, text data included in the content data 111 is sequentially displayed on the display screen 131 with a predetermined symbol ("¶" is used here) being used as the partition of meanings, that is, to indicate a portion enclosed by <Multi> and </Multi>.

Figure 9B:
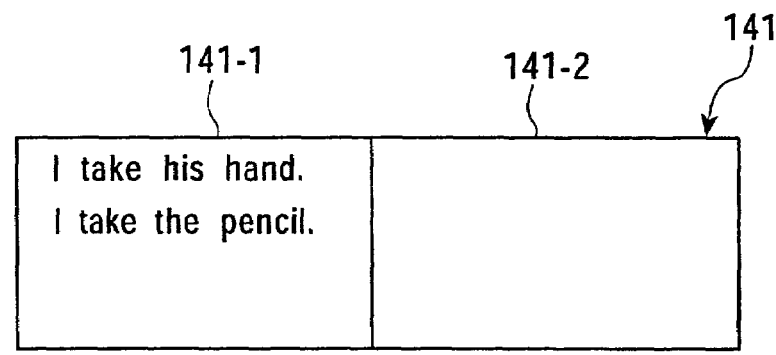
Figure 9B:
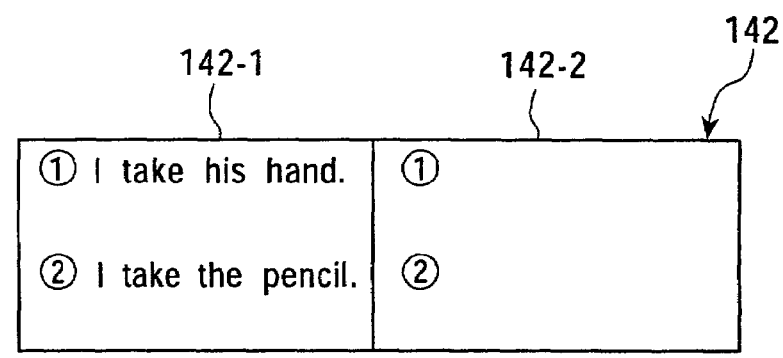

FIG. 9B shows a display screen 141 in which data written in two languages is displayed in a spread display manner. In spread display, the display screen 141 is divided into a left-hand display area 141-1 and a right-hand display area 141-2, and text data is divided by language and displayed. In the figure, English text data is displayed in the left-hand display area 141-1, and Japanese text data is displayed in the right-hand display area 141-2.

Serial numbers may be added, as shown in FIG. 9C, so that the user understands the correspondence between text data having the same meaning in the right-hand and left-hand display areas at a glance. In addition, when the length of text data differs between the right-hand and left-hand display areas due to the languages used, paragraph positioning is adjusted according to longer text data such that text data having the same meaning starts at the same line on the display screen 141.

Figure 9D:
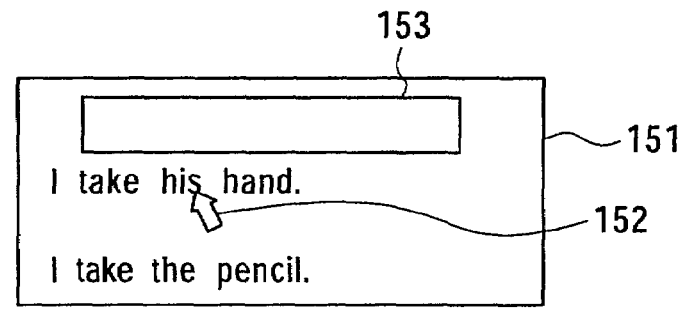

FIG. 9D shows a display screen 151 in which data written in one language is displayed, and a pop-up window 153 in which data written in the other language is displayed. In this display method, text data written in one language is displayed on the display screen 151, and when a predetermined operation is executed, such as moving a cursor 152 to the text data displayed on the display screen 151 or moving the cursor 152 and then clicking a mouse, the pop-up window 153 in which the corresponding text data written in the other language is described is displayed.

Sequential-display processing for displaying the display screen 131 described by referring to FIG. 9A will be described next by referring to a flowchart shown in FIG. 10.

In step S1, the control section 101 extracts data to be displayed on the display screen 131, according to a user's operation input at the input section 102 from the content data 111 specified by the user and recorded in the publication-data storage section 103.

In step S2, the control section 101 extracts data enclosed by <Multi> and </Multi> among the extracted content data 111, that is, data having the same meaning and written in multiple languages. In step S3, the control section 101 removes tags from the extracted data to leave text data only.

In step S4, the control section 101 adds a predetermined symbol such as "¶" to indicate the user the partition of meanings, at the end of the text data. In step S5, the control section 101 divides the text data into that for each line according to the size of the display area of the display screen 131 and the size of characters to be displayed, adds the relative address in the publication-data storage section 103, of the top data in each line, and buffers the data in the text display buffer 104.

FIG. 11 shows data buffered in the text display buffer 104. The data partitioned for each line as displayed according to the size of the display area of the display screen 131 and the size of characters to be displayed is buffered in the text display buffer 104 together with the relative address of the top data of the line.

In step S6, the control section 101 determines whether the processing has been applied to all data to be displayed. When it is determined in step S6 that all data has not yet been processed, the processing returns to step S2, and the subsequent processes are repeated.

When it is determined in step S6 that all data has been processed, the processing proceeds to step S7, and the control section 101 outputs the text data from the text display buffer 104 to the display section 105 to display the text data, and finishes the processing.

With this processing, the content data 111 described by referring to FIG. 8 is displayed on the display screen 131 described by referring to FIG. 9A.

Figure 10:
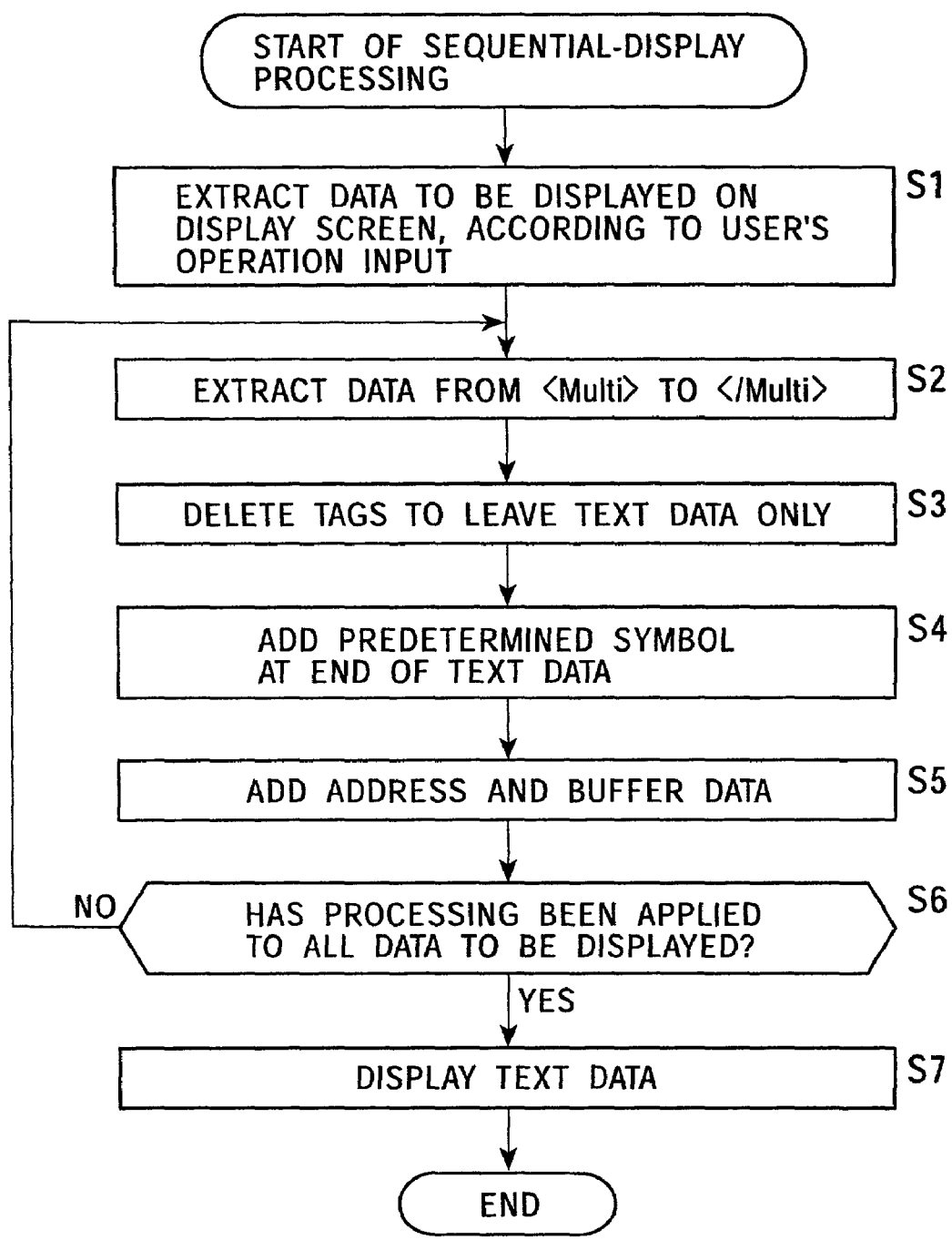
FIG. 10 is a flowchart of sequential-display processing.
Figure 13:
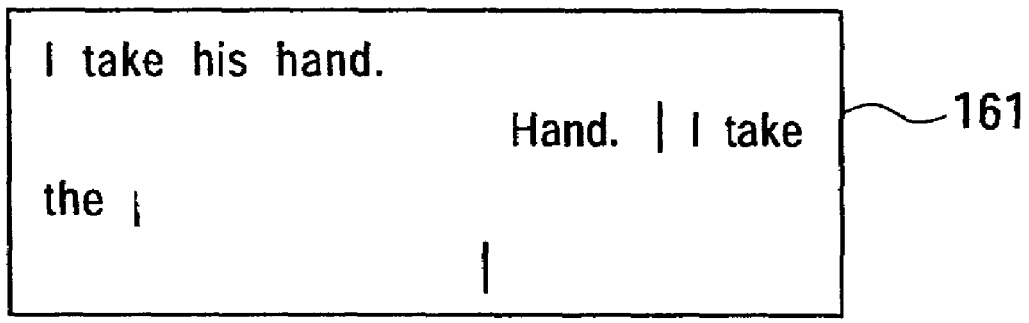
FIG. 13 is a view of a sequential-display screen generated with the content data shown in FIG. 12.

Even when the content data 111 has text data written in three languages, further including that written in German whose attribute is indicated by "de," or more, as shown in FIG. 12, text data written in the three languages (or more) is sequentially displayed with the symbol "l" being used as the partition of meanings by the sequential-display processing described by referring to FIG. 10 as in a display screen 161 shown in FIG. 13 in the same way as in FIG. 9A.

It is further possible that only data written in one language or more selected by the user is extracted from the content data 111 which includes data written in two or more languages, and the extracted data written in the selected language is sequentially displayed with the symbol "l" being used as the partition of meanings in the same way.

Spread display processing in two languages for displaying the display screen 142 described by referring to FIG. 9C will be described next by referring to a flowchart shown in FIG. 14. Since display processing for displaying the display screen 141 described by referring to FIG. 9B is basically the same as the spread display processing for displaying the display screen 142 except that serial numbers are not added, a description thereof is omitted.

In step S21, the control section 101 extracts data to be displayed on the display screen 142, according to a user's operation input at the input section 102 from the content data 111 specified by the user and recorded in the publication-data storage section 103.

In step S22, the control section 101 extracts data enclosed by <Multi> and </Multi> among the extracted content data 111, that is, data having the same meaning and written in multiple languages. In step S23, the control section 101 divides the extracted data by language into data to be displayed in the left-hand display area 142-1 and that to be displayed in the right-hand display area 142-2 by referring to the language attributes (such as "en" and "ja") indicated in the lang attribute.

In step S24, the control section 101 adds serial numbers for display to portions enclosed by <Phrase lang="**"> and </Phrase> in each of the data to be displayed in the left-hand display area 142-1 and that to be displayed in the right-hand display area 142-2. In step S25, the control section 101 removes tags from the data to be displayed in the left-hand display area 142-1 and that to be displayed in the right-hand display area 142-2 to leave text data only.

In step S26, the control section 101 divides the text data into that for each line according to the size of the display area of the display screen 142 and the size of characters to be displayed; arranges display lines so as to fit longer text data of that to be displayed in the left-hand display area 142-1 and that to be displayed in the right-hand display area 142-2; and adds continuity bits to lines such that the bit is "0" when the line is blank, and the bit is "1" when the line is not blank. In step S27, the control section 101 adds the relative address in the publication-data storage section 111, of the top data in each line, and buffers the data in the text display buffer 104.

FIG. 15 shows data buffered in the text display buffer 104. The data partitioned for each line as displayed according to the size of the display area of the display screen 142 and the size of characters to be displayed and to be displayed in the left-hand display area 142-1 is compared with that partitioned in the same way and to be displayed in the right-hand display area 142-2; display lines are adjusted such that data having the same meaning starts at the same line in the left-hand display area 142-1 and the right-hand display area 142-2; and a blank line is specified as required. In FIG. 15, blank lines are specified at the second and fourth lines in the left-hand display area 142-1. Continuity bits are added such that the bit is "0" for a blank line and the bit is "1" for a not-blank line. The data is buffered in the text display buffer 104 together with the relative address of the top part of each line.

In step S28, the control section 101 determines whether the processing has been applied to all data to be displayed. When it is determined in step S28 that all data has not yet been processed, the processing returns to step S22, and the subsequent processes are repeated.

When it is determined in step S28 that all data has been processed, the processing proceeds to step S29, and the control section 101 outputs the text data from the text display buffer 104 to the display section 105 to display the text data, and finishes the processing.

With this processing, the content data 111 described by referring to FIG. 8 is displayed on the display screen 142 described by referring to FIG. 9C.

Figure 14:
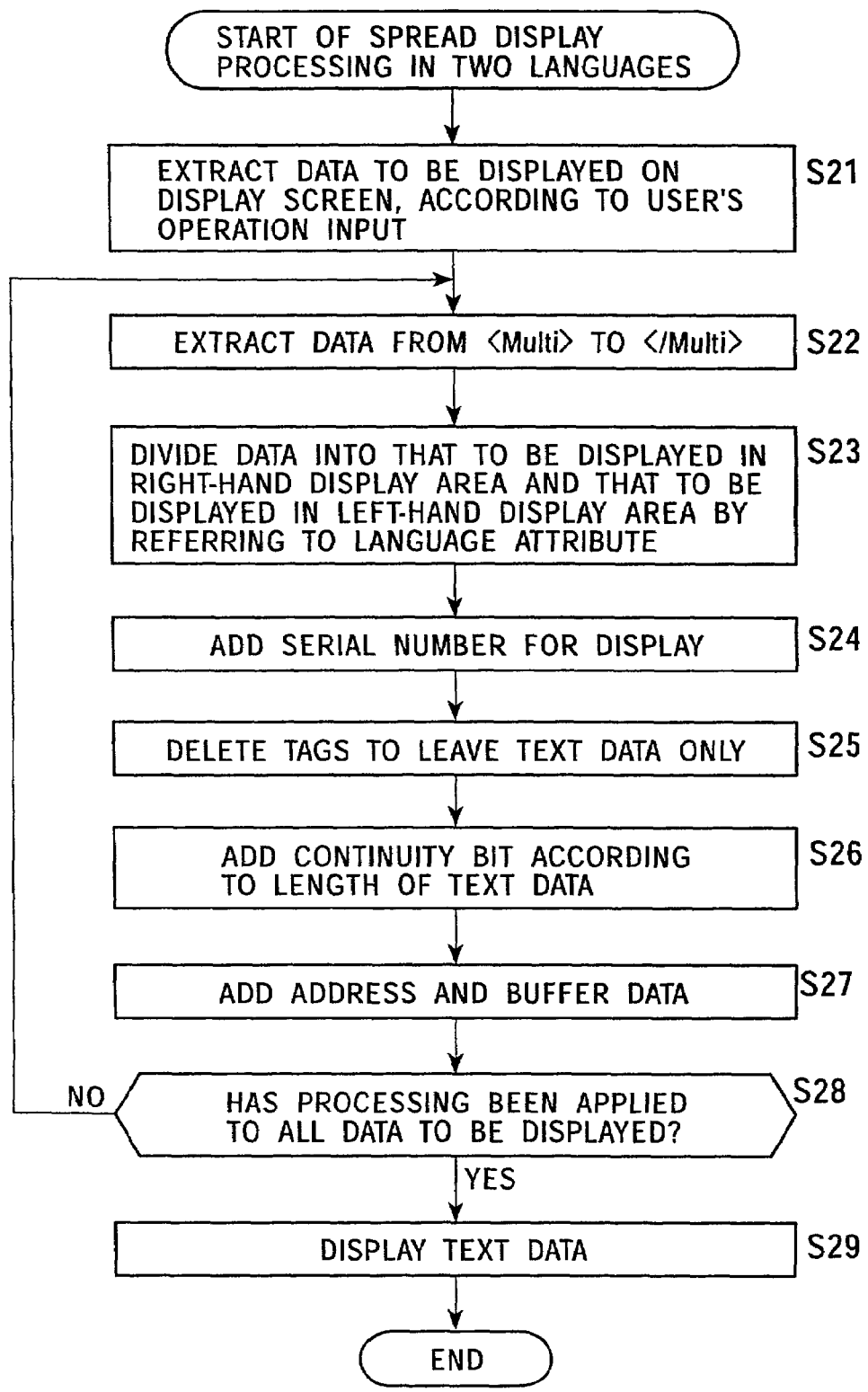
FIG. 14 is a flowchart of spread display processing for two languages.

To display in a spread manner text data written in three or more languages, described by referring to FIG. 12, it is necessary to provide processing different from that described by referring to FIG. 14. Spread display processing in three or more languages will be described next by referring to a flowchart shown in FIG. 16.

In step S41, the same process as in step S21 of FIG. 14 is executed.

In step S42, the control section 101 determines a number to specify a display area for each language attribute included in the data. When the content data 111 formed of data written in three languages, English, Japanese, and German, described by referring to FIG. 12 is used to generate a display screen, for example, numbers are determined for the languages, "1" for English, "2" for Japanese, and "3" for German.

In step S43, the same process as in step S22 of FIG. 14 is executed.

In step S44, the control section 101 classifies the extracted data by language by referring to the language attributes (such as "en," "ja," and "de") indicated in the lang attributes, and adds the numbers determined in step S42 according to the language attributes. In step S45, the control section 101 divides the extracted data according to the added numbers into data to be displayed in the display areas corresponding to the numbers.

From step S46 to S50, the same processes as in step S24 to step S28 in FIG. 14 are executed for each language.

When it is determined in step S50 that the processing has not yet been applied to all data, the processing returns to step S43 and the subsequent processes are repeated. When it is determined in step S50 that the processing has been applied to all data, the same process as in step S29 in FIG. 14 is executed in step S51, and the processing is terminated.

Figure 16:
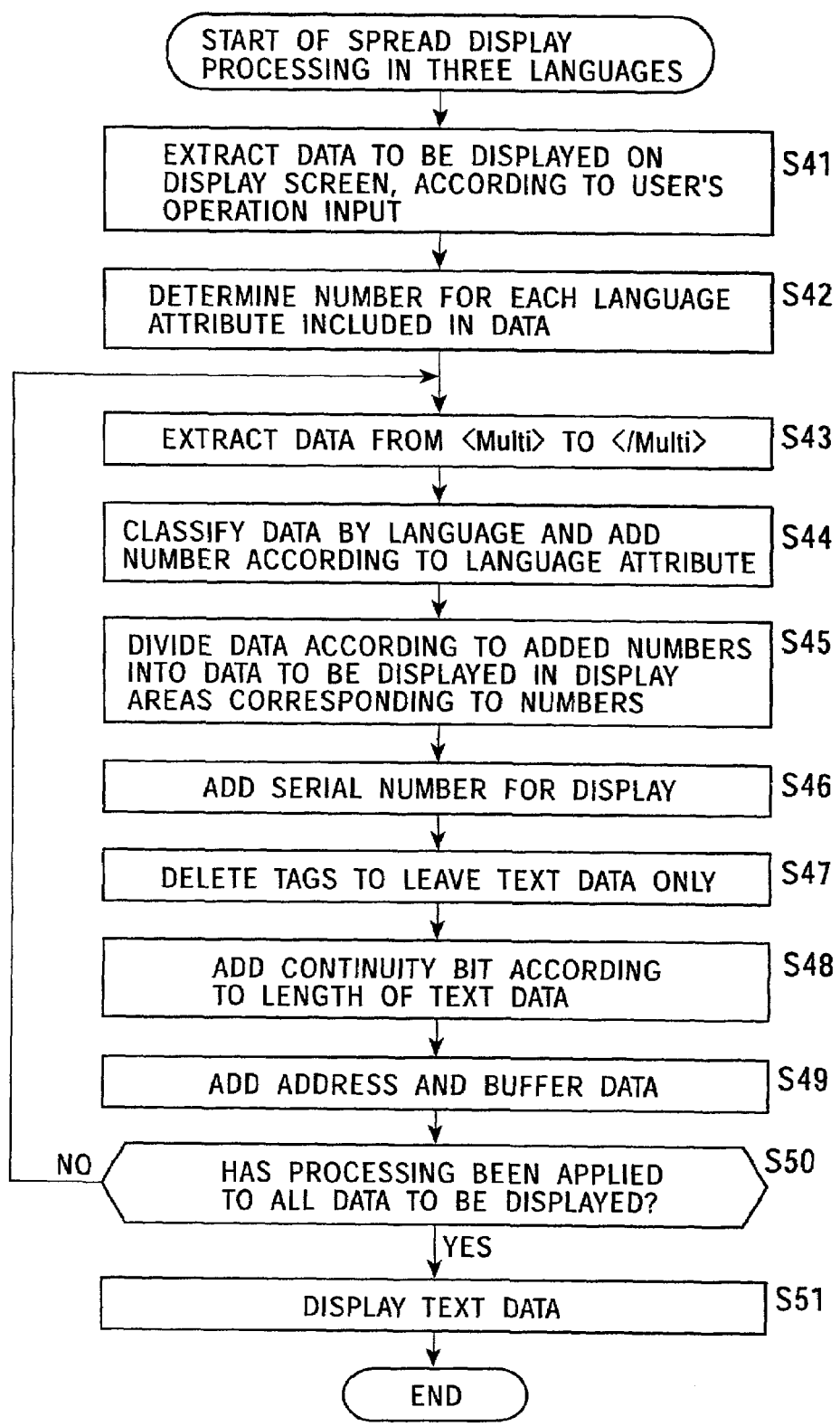
FIG. 16 is a flowchart of spread display processing for three languages.
Figure 17:
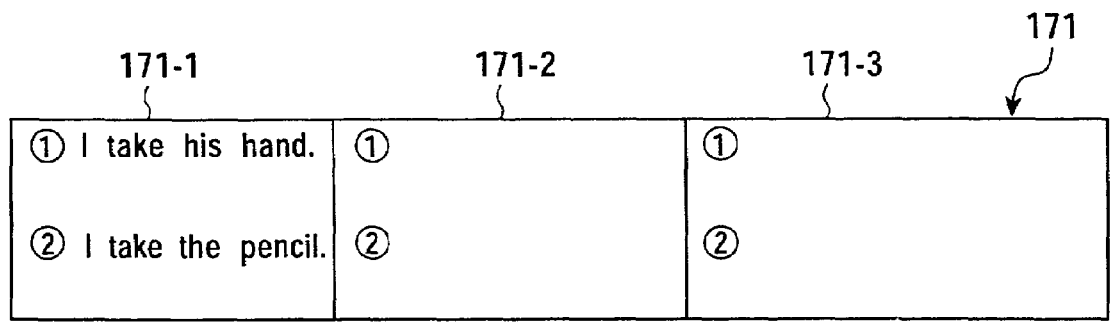
FIG. 17 is a view showing a spread display screen for three languages.

FIG. 17 shows a display screen 171 to be displayed when the processing described by referring to the flowchart shown in FIG. 16 is applied to the content data 111 described by referring to FIG. 12. English text data specified by "1" is displayed in a display area 171-1, Japanese text data specified by "2" is displayed in a display area 171-2, and German text data specified by "3" is displayed in a display area 171-3.

The numbers of display lines of text data having the same meaning, to be displayed in the display areas 171-1 to 171-3 are compared; display lines are adjusted such that data having the same meaning starts at the same line in the display areas; and a blank line is specified as required. In FIG. 17, blank lines are specified at the second and fourth lines in the display area 171-1 and at the second line in the display area 171-3 according to the lengths of the Japanese text data displayed in the display area 171-2.

In FIG. 17, the display screen 171 displayed by using the content data 111 written in the three languages is shown. The same display processing is also executed for content data written in three or more languages.

Figure 18A:
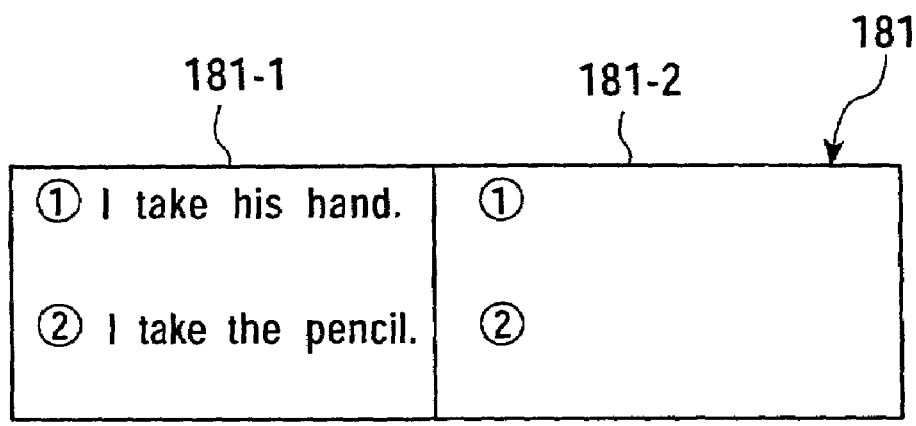
FIG. 18A and FIG. 18B are views of display screens obtained when the language can be selected and changed.
Figure 18B:
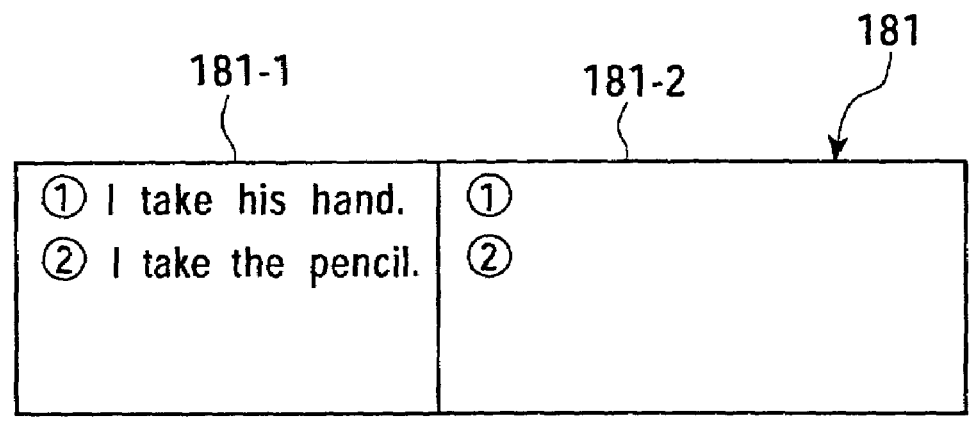

When the content data 111 is written in three or more languages, it is also possible that text data included in the content data 111 and written in two languages selected by the user is displayed in a left-hand display area 181-1 and a right-hand display area 181-2, as in display screens shown in FIG. 18A and FIG. 18B, in the same way as in the display screen 142 displayed in a spread display manner in two languages and described by referring to FIG. 9C. The user can change languages in which text data is displayed in the left-hand display area 181-1 and the right-hand display area 181-2. For example, the user can change an English and Japanese display mode shown in FIG. 18A to an English and German display mode shown in FIG. 18B.

Display switching processing for multiple languages will be described next by referring to flowcharts shown in FIG. 19 and FIG. 20. A description is made for a case in which the data described by referring to FIG. 12 is written in three languages.

In step S61, the control section 101 detects two languages to be used in the left-hand display area 181-1 and the right-hand display area 181-2 of the display screen 181 according to a user's operation input at the input section 102.

In step S62, the control section 101 extracts data to be displayed on the display screen 181 from the content data 111 specified by the user and recorded into the publication-data storage section 111, according to the user's operation input at the input section 102.

In step S63, the same process as in step S22 of FIG. 14 is executed.

In step S64, the control section 101 divides the extracted data into data to be displayed at the right-hand display area 181-1 and data to be displayed at the left-hand display area 181-2 according to the two languages detected in step S61 by referring to the language attributes (such as "en," "ja," and "de") indicated in the lang attributes, and reads them.

In step S65 to step S70, the same processes as in step S24 to step S29 in FIG. 14 are executed.

In step S71, the control section 101 determines according to the signal indicating a user's operation input from the input section 102 whether switching of the display languages has been specified. When it is determined in step S71 that switching of the display languages has not yet been specified, the processing returns to step S70, and the subsequent process is repeated.

When it is determined in step S71 that switching of the display languages has been specified, the processing proceeds to step S72, and the control section 101 extracts data written in the newly used language and to be newly displayed, from the publication-data storage section 103 according to the language attribute by using addresses buffered in the text display buffer 104 in response to the instruction of display-language switching.

In step S73, the same process as in step S63 is executed.

In step S74 and step S75, the same processes as in step S65 and step S66 are applied to the extracted data.

In step S76, the control section 101 removes data which has been displayed but is not to be displayed, from the data recorded in the text display buffer 104 according to the instruction of display-language switching.

In step S77, the control section 101 arranges display lines according to the lengths of text data written in the two languages to be used, such that blank lines do not occur in the same lines in the data to be displayed in the right-hand display area 181-1 and the data to be displayed in the left-hand display area 181-2, by referring to the continuity bits added to the data not deleted, and buffers them in the text display buffer 104.

In step S78, the control section 101 determines whether the processing has been applied to all data to be displayed. When it is determined in step S78 that the processing has not yet been applied to all data to be displayed, the processing returns to step S73 and the subsequent processes are repeated.

When it is determined in step S78 that the processing has been applied to all data to be displayed, the processing proceeds to step S79 and the control section 101 outputs the data from the text display buffer 104 to the display section 105 to display the text data, the processing returns to step S71, and the subsequent processes are repeated.

By referring to FIG. 18, the spread display screen 181 in two languages generated from the content data 111 formed in three languages has been described. Even when spread display in three or more languages is generated from content data formed in three or more languages, the same processing is executed to generate a display screen and used languages can be changed.

Figure 19:
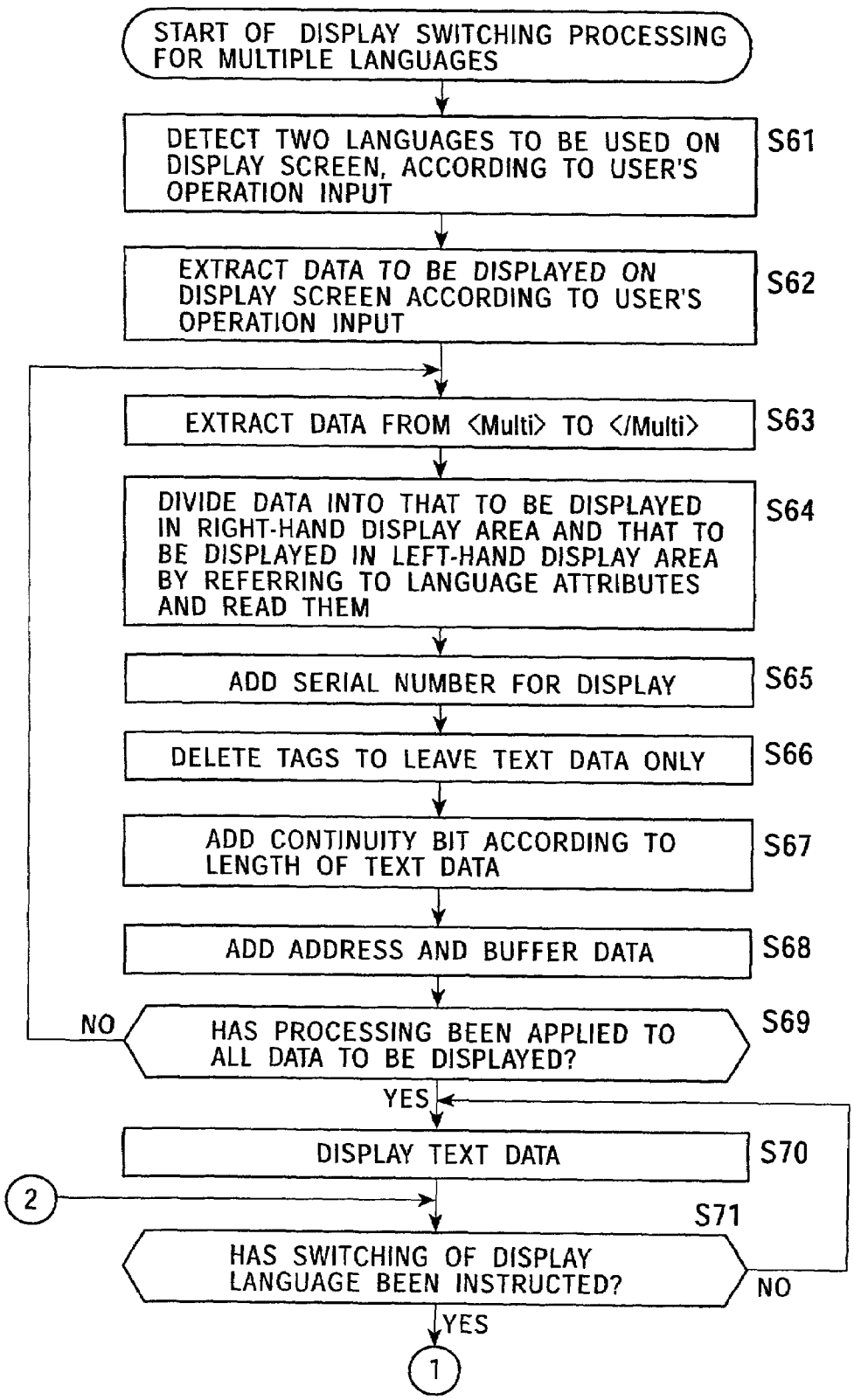
FIG. 19 is a flowchart of display switching processing for multiple languages.
Figure 20:
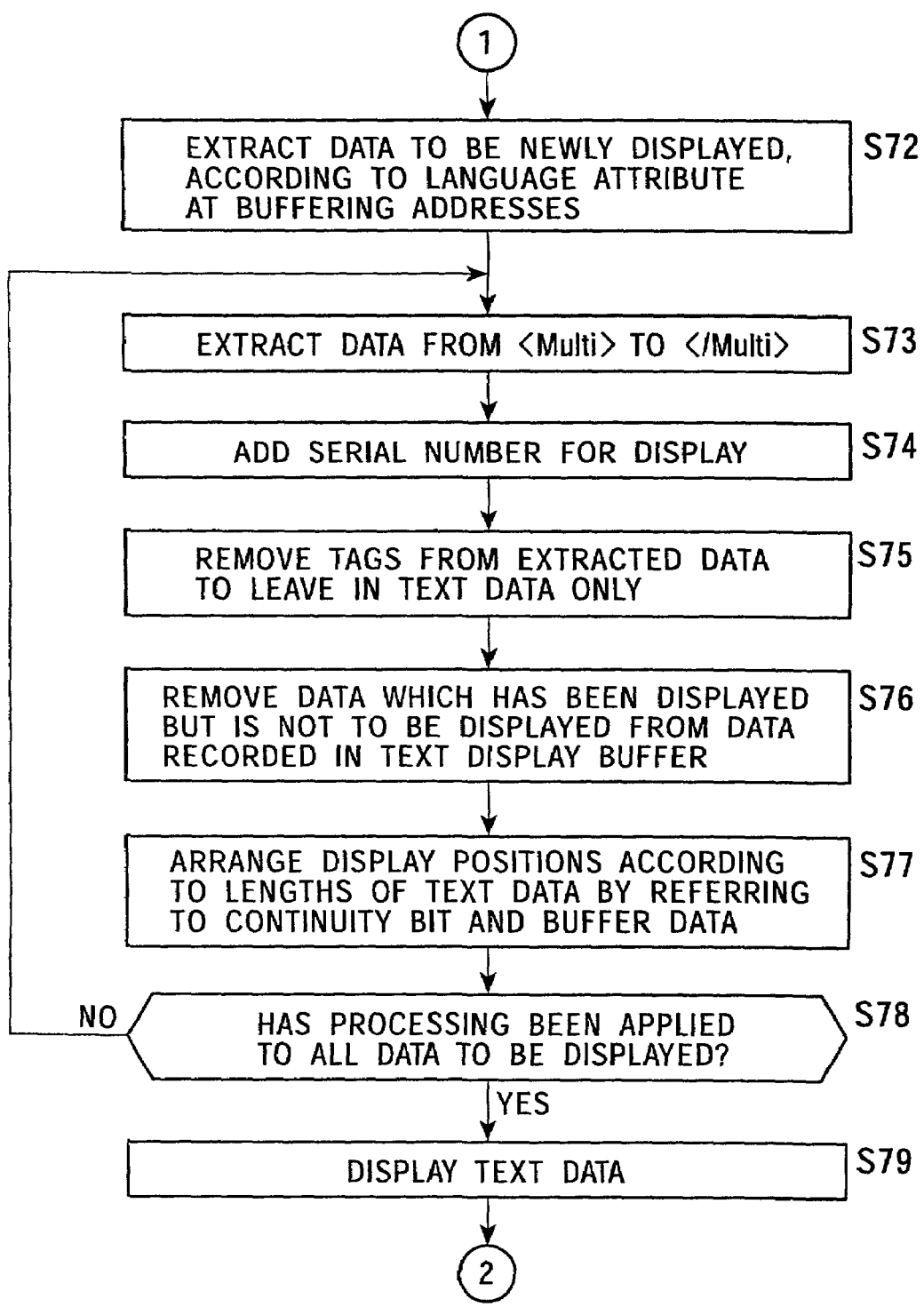
FIG. 20 is a view of the display switching processing for multiple languages.

In other words, it is possible, for example, that processing almost the same as that described by referring to FIG. 19 and FIG. 20 is executed to select three languages from five languages to display a display screen similar to the display screen 171 described by referring to FIG. 17 and to change used two languages at a time.

Pop-up display processing in two languages for displaying the display screen 151 and the pop-up window 153 described by referring to FIG. 9D will be described next by referring to a flowchart shown in FIG. 21.

In step S91, the control section 101 detects a language to be used in the display screen 151 according to the signal indicating a user's operation input at the input section 102.

A language to be used first in the display screen 151 is selected according to the user's operation in the foregoing description. A language to be used first in the display screen

151 may be determined in advance, for example, by the setting of a viewer (software used for browsing an electronic publication) or by the publishing form of an electronic publication. When the content data 111 is published as an electronic publication having a format of a Japanese-German sentence-equivalent dictionary or an English-Japanese sentence-equivalent dictionary, for example, the language suited to its use may be first used.

In step S92, the control section 101 extracts data from the dictionary-data storage section 103 so as to be able to generate one display screen in the language to be used in the display screen 151. In step S93, the control section 101 extracts only the data written the language to be used in the display screen 151 by referring to the language attribute (such as "en" and "ja") indicated in the lang attribute, and temporary stores the data written in the other language.

In step S94, the control section 101 removes tags from the extracted display data to leave text data only. In step 595, the control section 101 divides the text data into that for each line according to the size of the display area of the display screen 151 and the size of characters to be displayed, adds the relative address in the publication-data storage section 103, of the top data in each line, and buffers the data in the text display buffer 104.

Figure 22:
FIG. 22 is a view showing data buffered in the text display buffer.

FIG. 22 shows data buffered in the text display buffer 104. The data partitioned for each line as displayed according to the size of the display area of the display screen 151 and the size of characters to be displayed is buffered in the text display buffer 104 together with the relative address of the top data of the line. English is selected as the language to be used, and the text display buffer 104 stores data having an attribute of English. As pop-up data, data having an attribute of Japanese is temporarily stored.

In step S96, the control section 101 outputs the data from the text display buffer 104 to the display section 105 to display the text data.

In step S97, the control section 101 determines according to a signal input from the input section 102 whether a predetermined operation input for displaying the pop-up window 153 has been received, such as the movement of the cursor 152 to the area where a predetermined text is being displayed, or an operation such as clicking is executed when the cursor 152 has been moved to the area where a predetermined text is being displayed.

When it is determined in step S97 that the predetermined operation input for displaying the pop-up window 153 has not been received, the process of step S97 is repeated until it is determined that the predetermined operation input has been received.

When it is determined in step S97 that the predetermined operation input for displaying the pop-up window 153 has been received, the control section 101 obtains in step S98 the position where the operation input has been performed, according to the signal input from the input section 102. In step S99, the control section 101 generates the data corresponding to the pop-up window 153 in which the text data corresponding to the data displayed at the obtained position is written in the other language. The control section 101 outputs the generated data to the display section 105 to display the pop-up window 153 in step S100.

In step S101, the control section 101 determines according to a signal input from the input section 102 whether a predetermined operation input for deleting the pop-up window 153 has been received, such as the movement of the cursor 152 away from the area where a predetermined text is displayed.

When it is determined in step S101 that the predetermined operation input for deleting the pop-up window 153 has not been received, the process of step S101 is repeated until it is determined that the predetermined operation input for deleting the pop-up window 153 has been received.

When it is determined in step S101 that the predetermined operation input for deleting the pop-up window 153 has been received, the control section 101 controls the display section 105 so as to delete the pop-up window 153 being displayed, the processing returns to step S97, and the subsequent processes are repeated.

With such processing, the display screen 151 described by referring to FIG. 9D is displayed, and the pop-up window 153 is displayed according to a user's operation.

Figure 21:
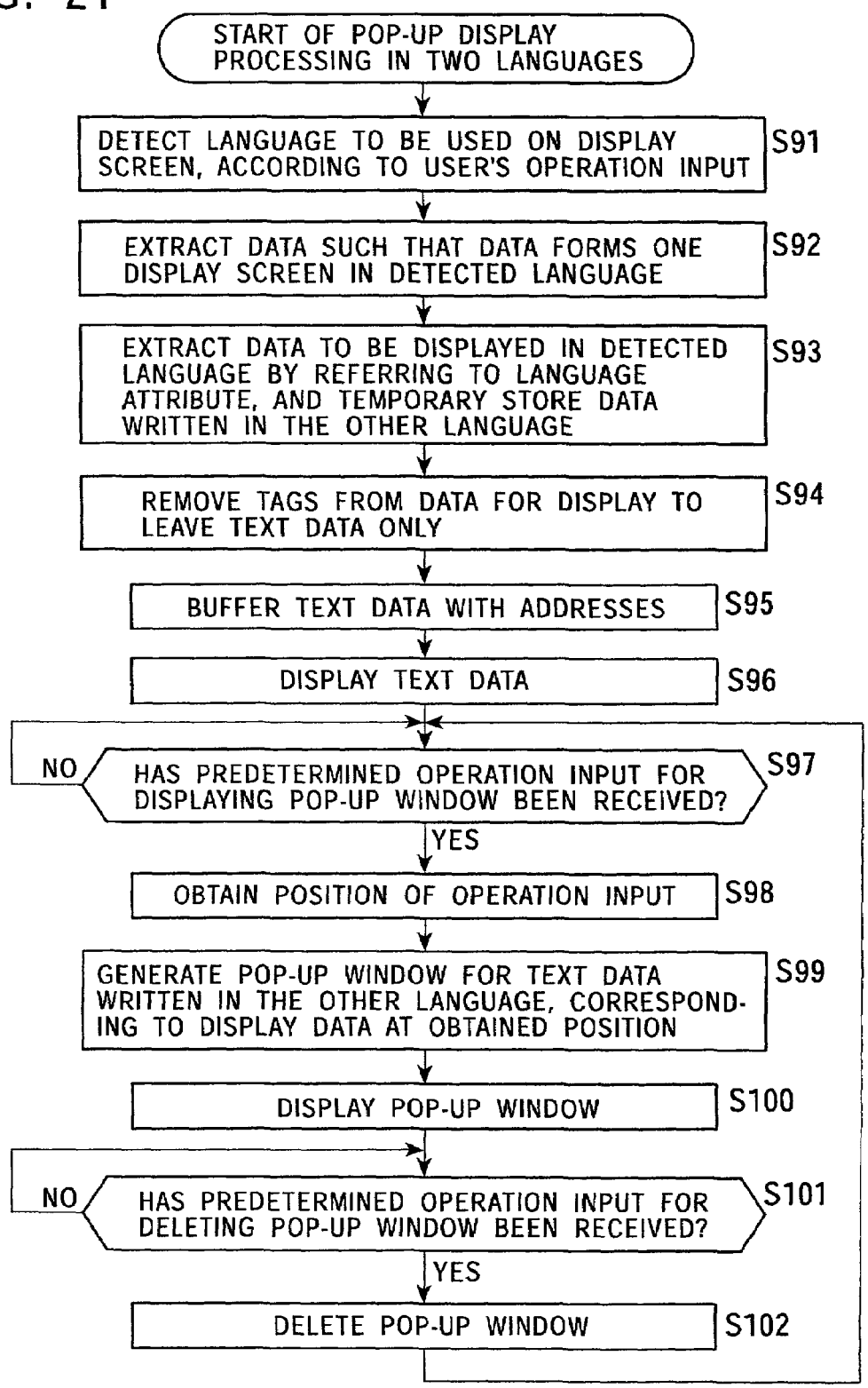
FIG. 21 is a flowchart of pop-up display processing for two languages.

In FIG. 21, the data written in the other language for the pop-up window 153 is temporarily stored. It is also possible that, without temporarily storing the data written in the other language for the pop-up window 153, the data written in the other language for the pop-up window 153 is read from the publication-data storage section 103 according to the addresses added to display data buffered in the text display buffer 104 to generate the pop-up window 153.

To sequentially pop-up display data written in multiple languages corresponding to that written in a language displayed first by using the content data 111 written in three or more languages, described by referring to FIG. 12, it is necessary to provide processing different from that described by referring to FIG. 21. Pop-up display processing in three or more languages will be described next by referring to flowcharts shown in FIG. 23 and FIG. 24.

In step S111 and step S112, the same processes as those in step S91 and step S92 of FIG. 21 are executed.

A language to be used first is selected according to a user's operation in the foregoing description. A language to be used first may be determined in advance, for example, by the setting of a viewer (software used for browsing an electronic publication) or by the publishing form of an electronic publication, in the same way as for the description made by referring to FIG. 21.

In step S113, the control section 101 extracts only the data written in the language to be used in the display screen 151 by referring to the language attribute (such as "en," "ja," and "de") indicated in the lang attribute, and temporary stores the data written in the other languages with display orders being assigned. In step S114, the control section 101 sets "n" to the number of the other languages in which the data has been temporarily stored, and stores "n" in its internal register.

In step S115 to step S119, the same processes as those in step S94 to step S98 of FIG. 21 are executed.

In step S120, the control section 101 sets the value "m" of a register for counting the number of languages in which data has been pop-up displayed to 1. In step S121, the control section 101 extracts the text data written in a first language, corresponding to the data displayed at the position of the operation input obtained in step S119.

In step S122, the control section 101 generates the data corresponding to the pop-up window in which the extracted text data is written. In step S123, the control section 101 outputs the generated data to the display section 105 to display the pop-up window 153, or a pop-up window 191 to be described later by referring to FIG. 25B.

In step S124, the control section 101 increments the value "m" of the register for counting the number of languages in which text data is pop-up displayed, by 1. In step S125, the control section 101 determines whether a predetermined operation input for displaying the next pop-up window has been received, such as a clicking operation executed without moving the position of the cursor 152.

When it is determined in step S125 that the predetermined operation input for displaying the next pop-up window has been received, the processing proceeds to step S126, and the control section 101 determines whether the value "m" of the register is larger than "n." When it is determined in step S126 that the value "m" of the register is larger than "n," the processing returns to step S120 and the subsequent processes are repeated.

When it is determined in step S126 that the value "m" of the register is not larger than "n," the processing proceeds to step S127, and the control section 101 extracts the text data written in the other m-th language, corresponding to the data displayed at the position of the operation input obtained in step S119, the processing returns to step S122, and the subsequent processing is repeated.

When it is determined in step S125 that the predetermined operation input for displaying the next pop-up window has not been received, the processing proceeds to step S128, and the control section 101 determines whether a predetermined operation input for deleting the pop-up window has been received, such as the movement of the cursor 152.

When it is determined in step S128 that the predetermined operation input for deleting the pop-up window has not been received, the processing returns to step S125, and the subsequent processes are repeated. When it is determined in step S128 that the predetermined operation input for deleting the pop-up window has been received, the processing proceeds to step S129, and the control section 101 controls the display section 105 so as to delete the pop-up window 153 being displayed, or the pop-up window 191 to be described later by referring to FIG. 25B. Then, the processing returns to step S118, and the subsequent processes are repeated.

Figure 25A:
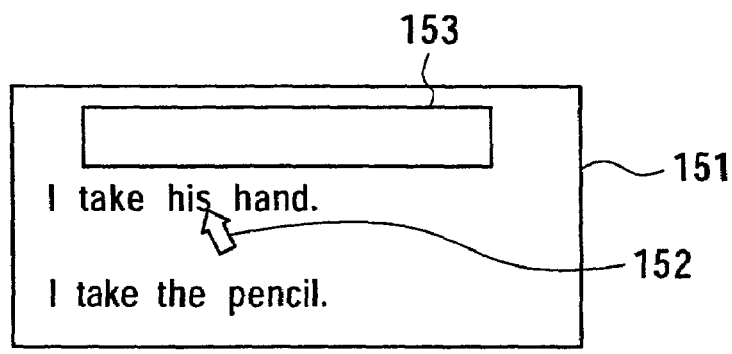
FIG. 25A and FIG. 25B are views showing a case in which a pop-up window display is changed.
Figure 25B:
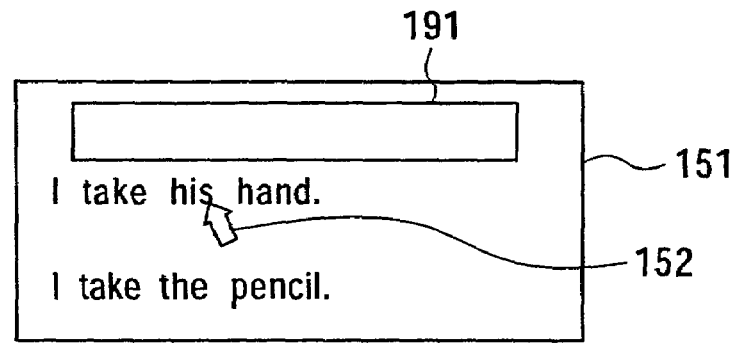

With such processing, after a translation in Japanese is displayed in the pop-up window 153 as shown in FIG. 25A, for example, a translation in German is continuously displayed in the second pop-up window 191, as shown in FIG. 25B. An operation such as clicking causes the next pop-up window to appear in the foregoing description. It is possible, for example, that the language in which data is displayed is changed at a predetermined time interval until the deletion of the pop-up window is instructed.

In FIG. 25A and FIG. 25B, pop-up display is executed by using the content data 111 written in three languages. Even when the content data 111 is written in three or more languages, it is also possible that the language used in the pop-up window is switched by the processing described by referring to FIG. 23 and FIG. 24.

Figure 23:
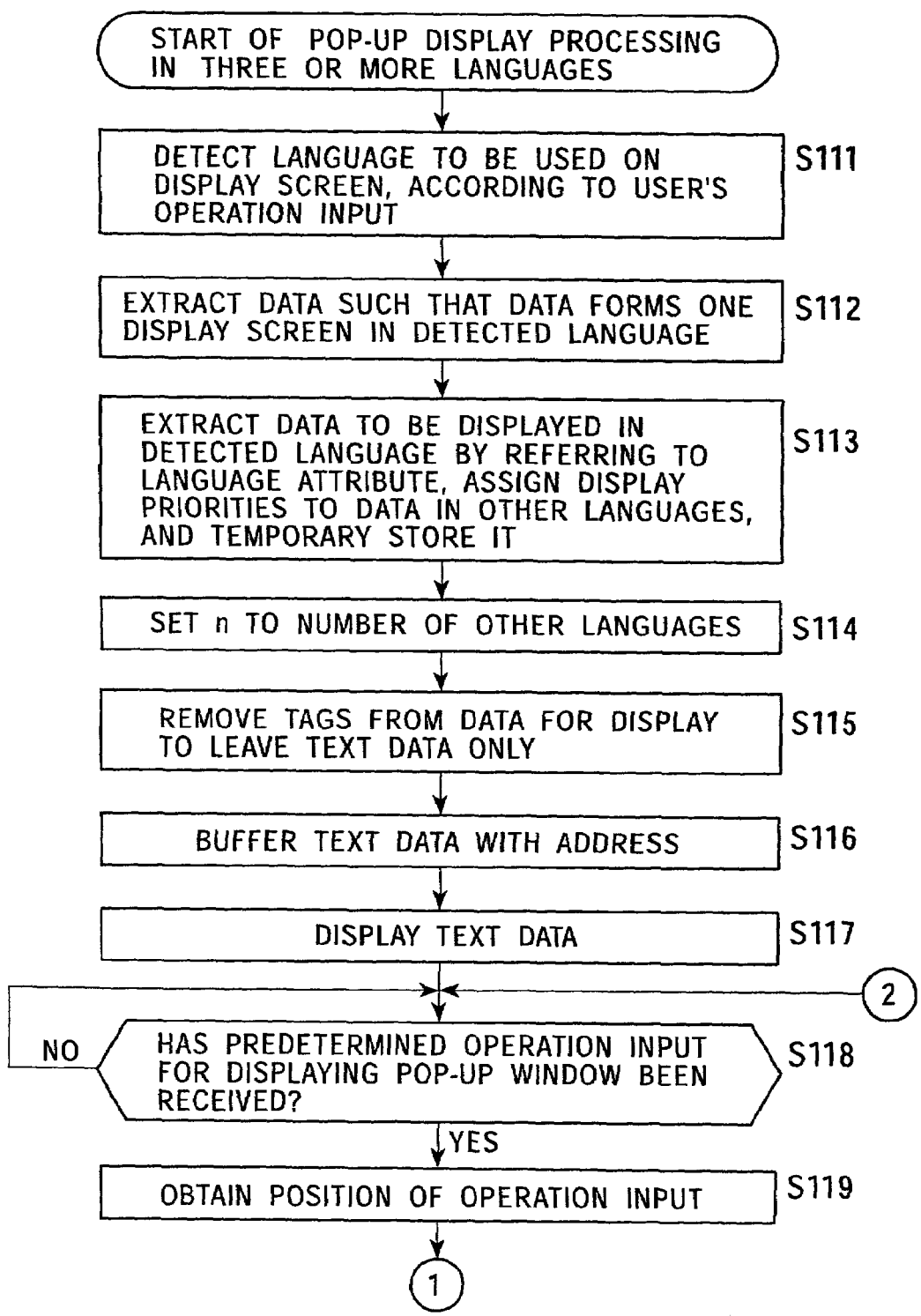
FIG. 23 is a flowchart of pop-up display processing for three or more languages.
Figure 24:
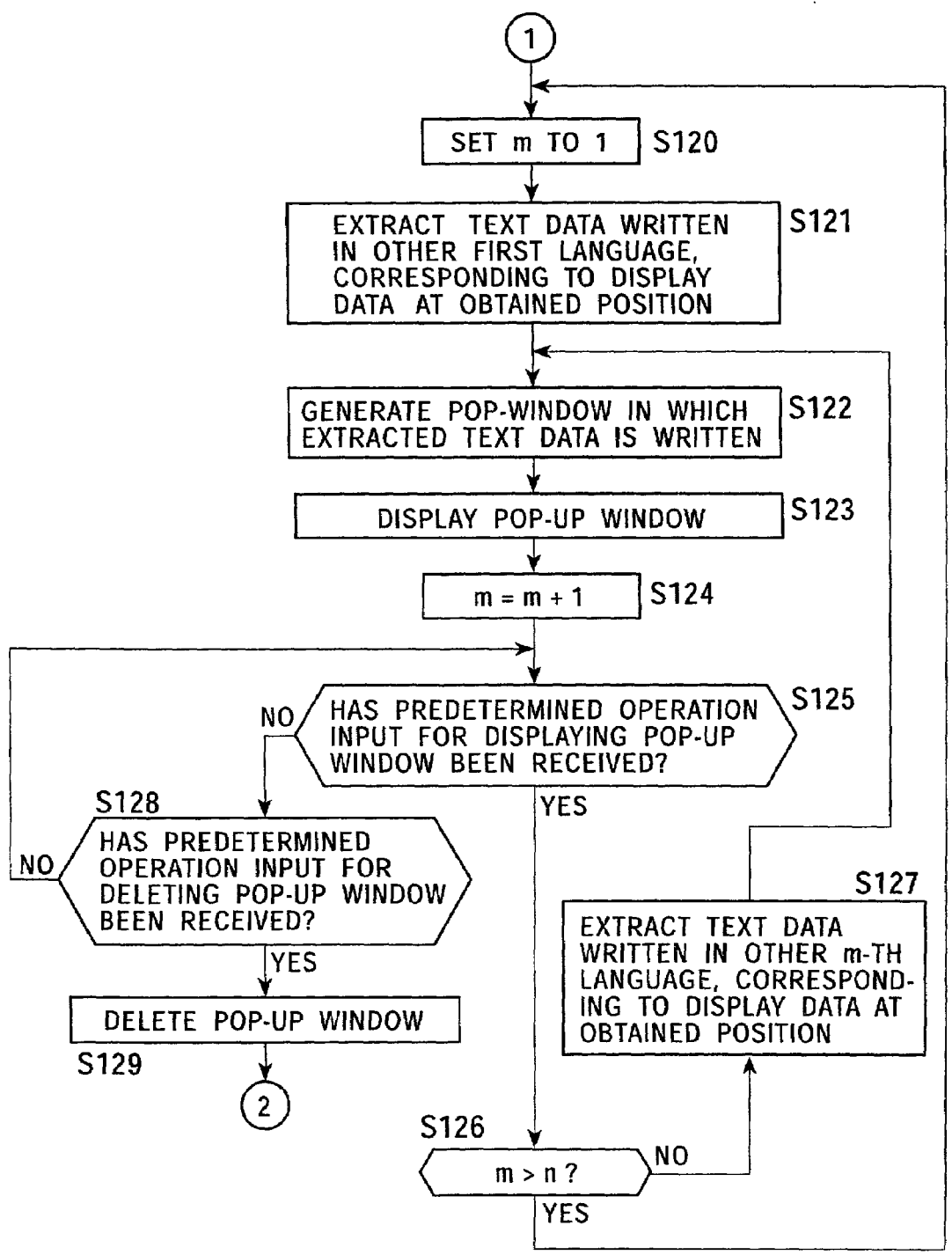
FIG. 24 is a flowchart of the pop-up display processing for three or more languages.

In the processing described by referring to FIG. 23 and FIG. 24, the data written in the languages for the pop-up window 153 or the pop-up window 191 is temporarily stored in the same way as in the processing described by referring to FIG. 21. It is also possible that, without temporarily storing the data written in the languages for the pop-up window 153 or the pop-up window 191, the data written in the languages for the pop-up windows is read from the publication-data storage section 103 according to the addresses buffered in the text display buffer 104 by referring to the language attributes.

It is possible that the processing described by referring to FIG. 9A to FIG. 25B is independently executed as the processing of the viewer. It is also possible that the viewer is able to display the content data 111 by a plurality of display methods.

Display-method selection processing 1 in which the user can select the display method of the content data 111 written in two languages will be described next by referring to a flowchart shown in FIG. 26.

In step S141, the control section 101 receives a display-method selection input from the user according to an input signal input from the input section 102.

In step 142, the control section 101 determines whether sequential display has been selected.

When it is determined in step S142 that sequential display has been selected, the processing proceeds to step S143, and the sequential-display processing, described by referring to FIG. 10, is executed. Then, the display-method selection processing 1 is finished.

When it is determined in step S142 that sequential display has not been selected, the processing proceeds to step S144, and the control section 101 determines whether spread display has been selected.

When it is determined in step S144 that spread display has been selected, the processing proceeds to step S145, and the spread display processing for two languages, described by referring to FIG. 14, is executed. Then, the display-method selection processing 1 is finished.

When it is determined in step S144 that spread display has not been selected, the processing proceeds to step S146, and the control section 101 determines whether pop-up display has been selected.

When it is determined in step S146 that pop-up display has been selected, the processing proceeds to step S147, and the pop-up display processing for two languages, described by referring to FIG. 21, is executed. Then, the display-method selection processing 1 is finished.

When it is determined in step S146 that pop-up display has not been selected, the processing proceeds to step S148, and the control section 101 makes the display section 105 display an error message indicating that the display method corresponding to the user's operation input has not been correctly selected. Then, the display-method selection processing 1 is finished.

With such processing, the content data can be displayed by different display methods according to its use.

Display-method selection processing 2 in which the user can select the display method of the content data 111 written in three or more languages will be described next by referring to a flowchart shown in FIG. 27.

In step S161, the control section 101 receives a display-method selection input from the user according to an input signal input from the input section 102.

In step 162, the control section 101 determines whether sequential display has been selected.

When it is determined in step S162 that sequential display has been selected, the processing proceeds to step S163, and the sequential-display processing, described by referring to FIG. 10, is executed. Then, the display-method selection processing 2 is finished.

When it is determined in step S162 that sequential display has not been selected, the processing proceeds to step S164, and the control section 101 determines whether spread display has been selected.

When it is determined in step S164 that spread display has been selected, the processing proceeds to step S165, and the spread display processing for three or more languages, described by referring to FIG. 16, is executed. Then, the display-method selection processing 2 is finished.

When it is determined in step S164 that spread display has not been selected, the processing proceeds to step S166, and the control section 101 determines whether pop-up display has been selected.

When it is determined in step S166 that pop-up display has been selected, the processing proceeds to step S167, and the pop-up display processing for three or more languages, described by referring to FIG. 23 and FIG. 24, is executed. Then, the display-method selection processing 2 is finished.

When it is determined in step S166 that pop-up display has not been selected, the processing proceeds to step S168, and the control section 101 determines whether spread display in selected two languages has been selected.

When it is determined in step S168 that spread display in selected two languages has been selected, the processing proceeds to step S169, and the display switching processing for multiple languages, described by referring to FIG. 19 and FIG. 20, is executed. Then, the display-method selection processing 2 is finished.

When it is determined in step S168 that spread display in selected two languages has not been selected, the processing proceeds to step S170, and the control section makes the display section 105 display an error message indicating that the display method corresponding to the user's operation input has not been correctly selected. Then, the display-method selection processing 2 is finished.

Figure 26:
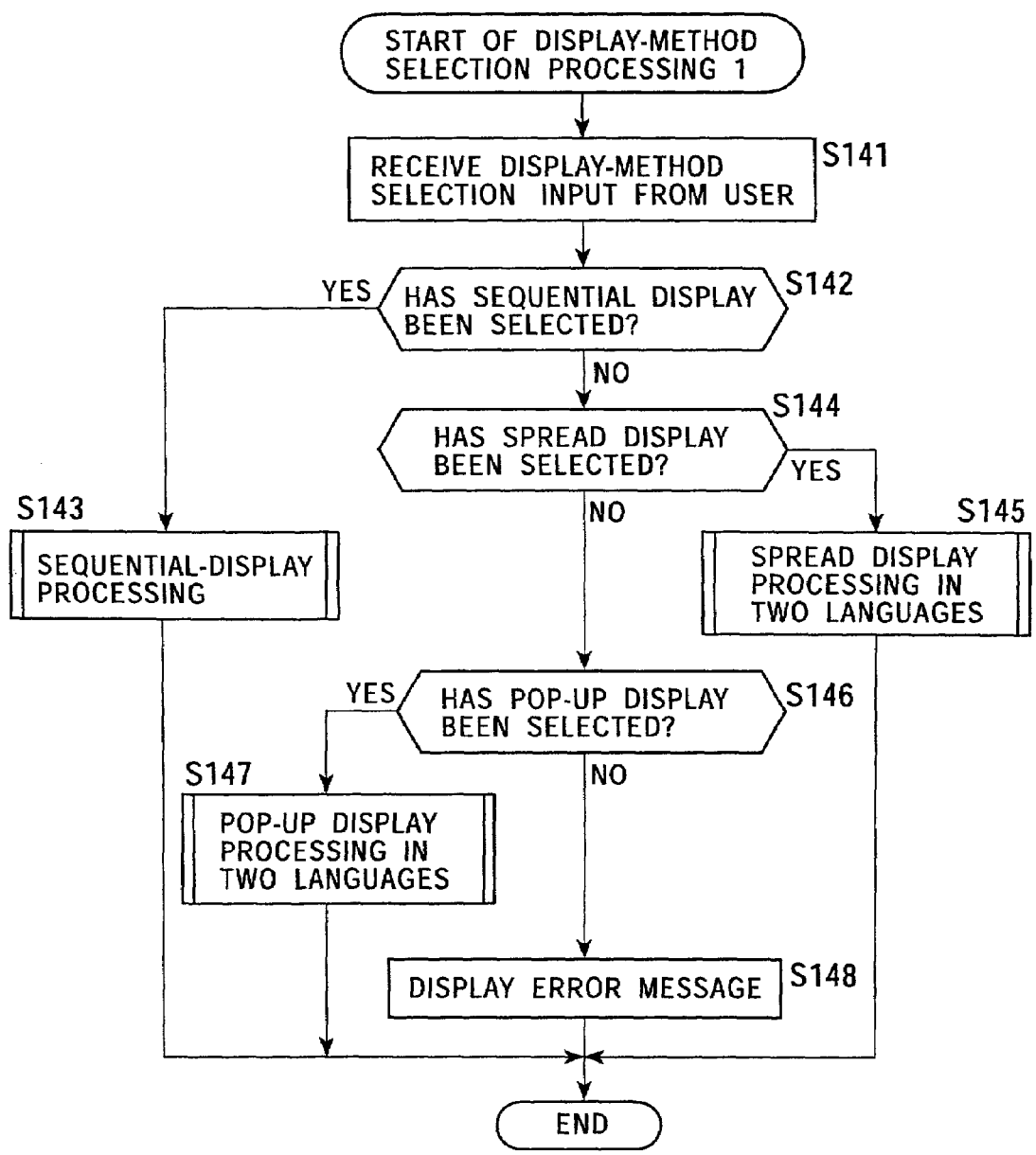
FIG. 26 is a flowchart of display-method selection processing 1.

With such processing, the content data can be displayed by different display methods according to its use in the same way as in the case described by referring to FIG. 26.

In the processing described above, electronic publications formed mainly of text data have been described. Even when electronic publications include audio data, image data, or motion-image data, or even when object data or other content data is read and displayed, the same processing can be executed.

Since electronic-publication publishers can adapt the present invention to display the same content data in various manners, the use of electronic-publication content data is extended, and the value of the content data as a data base is increased. In addition, it is very easy to maintain, for example, to change information of and to add information to, content data having such a data structure.

Further, when an electronic publication of an English novel and its Japanese translation is generated from content data having the above-described data structure, it is very easy to take out only the English part or the Japanese translation part, and the user can use it for various purposes. In the same way, when an electronic English-Japanese dictionary is generated from content data having the above-described data structure, it is very easy to execute processing for extracting English sentences only and for searching them.

The above-described series of processing can also be executed by software. A program constituting the software is installed from a recording medium into a computer which is built in special hardware, or into a general-purpose personal computer which can execute various types of processing when various programs are installed.

The recording medium includes a package medium which stores the program and is distributed separately from a computer to provide the user with the program, such as a magnetic disk 14 (including a floppy disk), an optical disk 15 (including a compact disk read only memory (CD ROM), and a digital versatile disk (DVD)), a magneto-optical disk 16 (including a Mini disk (MD) (trademark)), or a semiconductor memory 17, as shown in FIG. 3 to FIG. 6.

In the present specification, the steps describing the program recorded in a recording medium include not only processing executed in a time-sequential manner in a described order but processing not necessarily executed in a time-sequential manner but executed in parallel or independently.

In the present specification, a system refers to the entire equipment formed of a plurality of apparatuses.

What is claimed is:

1. An information processing apparatus for displaying information in a plurality of display formats, comprising:
    input means for receiving an operation input of a user, wherein the operation input of the user includes a selection of one display format from the plurality of display formats;
    acquisition means for acquiring first information;
    extraction means for extracting a selected part from the first information acquired by the acquisition means according to the operation input of the user using the input means;
    first detection means for detecting second information included in the selected part of the first information extracted by the extraction means wherein the second information is data having the same meaning and written in multiple languages;
    classification means for classifying the selected part of the first information extracted by the extraction means according to the second information detected by the first detection means to generate a plurality of pieces of third information consisting of text only data;
    calculation means for calculating a number of display lines required to display each of the plurality of pieces of third information based on the one display format selected by the user;
    generation means for determining a display position of each of the plurality of pieces of third information according to calculation results of the calculation means so that a piece of a third information having the largest number of display lines can fit and for generating fourth information for display based on the user selected display format, wherein the fourth information includes sixth information indicating whether a corresponding line is a blank line;
    save means for saving the fourth information generated by the generation means; and
    display means for displaying the fourth information saved by the save means in accordance with the user selected display format.

2. The information processing apparatus according to claim 1, further comprising second detection means for detecting fifth information indicating save position of a portion of the first information corresponding to the fourth information, and
    wherein the same means further saves the fifth information detected by the second detection means.

3. The information processing apparatus according to claim 1, wherein the generation means changes any of the plurality of pieces of third information included in the fourth information to generate new fourth information by referring to the sixth information included in the current fourth information saved by the save means.

4. The information processing apparatus according to claim 1, wherein the classification means classifies the test data by the type of language according to the second information to generate the plurality of pieces of third information.

5. The information processing apparatus according to claim 1, wherein the first information is written in a markup language.

6. The information processing apparatus according to claim 1, wherein the sixth information is at least one continuity bit.

7. The information processing apparatus according to claim 6, wherein the continuity bit is a "0" to indicate a blank line, and a "1" to indicate a notblank line.

8. An information processing method for displaying information in a plurality of display formats, comprising:
- an input control step for receiving an operation input of a user, wherein the operation input of the user includes a selection of a display format from the plurality of display formats;
- an acquisition control step of controlling acquisition of first information;
- an extraction step of extracting a selected part from the first information acquired in the acquisition control step according to the operation input of the user received in the input control step;
- a detection step of detecting second information included in the selected part of the first information extracted by the extraction step wherein the second information is data having the same meaning and written in multiple language;
- a classification step of classifying the selected part of the first information extracted by the extraction step according to the second information detected by the detection step to generate a plurality of pieces of third information consisting of text only data;
- a calculation step of calculating a number of display lines required to display each of the plurality of pieces of third information based on the one display format selected by the user;
- a generation step of determining a display position of each of the plurality of pieces of third information according to calculation results obtained by the calculation step so that a piece of the third information having a largest number of display lines can fit and generating fourth information for display based on the user selected display format, the fourth information including sixth information indicating whether a corresponding line is a blank line;
- a save control step of controlling a save operation of the fourth information generated by the generation step; and
- a display control step of controlling a display of the fourth information saved in the save control step in accordance with the user selected display format.

9. A recording medium storing a computer-readable program for programming a computer to display information in a plurality of display formats, the program comprising:
- an input control step for receiving an operation of a user, wherein the operation input of the user includes a selection of a display format from the plurality of display formats;
- an acquisition control step of controlling acquisition of first information;
- an extraction step of extracting a selected part from the first information acquired in the acquisition control step according to the operation input of the user received in the input control step;
- a detection step of detecting second information included in the selected part of the first information extracted by the extraction step wherein the second information is data having the same meaning and written in different languages;
- a classification step of classifying the selected part of the first information extracted by the extraction step, according to the second information detected by the process of the detection step to generate a plurality of pieces of third information;
- a calculation step of calculating a number of display lines required to display each of the plurality of pieces of third information based on the one display format selected by the user;
- a generation step of determining a display position of each of the plurality of pieces of third information according to calculation results obtained by the calculation step so that a piece of the third information having a largest number of display lines can fit and generating fourth information for display based on the user selected display format, the fourth information including sixth information indicating whether a corresponding line is a blank line;
- a save control step of controlling the save operation of the fourth information generated by the generation step; and
- a display control step of controlling a display of the fourth information saved in the save control step in accordance with the user selected display format.

10. A program in the form of code residing in a memory of a computer for programming the computer to produce a tangible result in the form of a display of information in a plurality of display formats, comprising:
- an input control step for receiving an operation input of a user, wherein the operation input of the user includes a selection of one display format from the plurality of display formats;
- an acquisition control step of controlling acquisition of first information;
- an extraction step of extracting a selected part from the first information acquired in the acquisition control step according to the operation input of the user received in the input control step;
- a detection step of detecting second information included in the selected part of the first information extracted by the extraction step wherein the second information is data having the same meaning and written in different languages;
- a classification step of classifying the selected part of the first information extracted by the extraction step according to the second information detected by the detection step to generate a plurality of pieces of third information;
- a calculation step of calculating a number of display lines required to display each of the plurality of pieces of third information based on the one display format at selected by the user;
- a generation step of determining a display position of each of the plurality of pieces of third information according to calculation results obtained by the calculation step so that a piece of the third information having a largest number of display lines can fit and generating fourth information for display based on the user selected display format, the fourth information including sixth information indicating whether a corresponding line is a blank line;
- a save control step of controlling a save operation of the fourth information generated by the generation step; and a display control step of controlling a display of the fourth information saved in the save control step in accordance with the user selected display format.

11. An information processing apparatus for displaying information in a plurality of display formats, comprising:

input means for receiving an operation input of a user, wherein the operation input of the user includes a selection of one display format from the plurality of display formats;

acquisition means for acquiring first information;

first extraction means for extracting a selected part from the first information acquired by the acquisition means according to the operation input of the user using the input means;

first detection means for detecting second information included in the selected part of the first information extracted by the first extraction means;

second extraction means for extracting third information from the selected part of the first information extracted by the first extraction means according to the second information detected by the first detection means;

generation means for generating display data according to the third information based on the one display format selected by the user, and for generating sixth information indicating whether a corresponding line is a blank line; and display means for displaying the display data generated by the generation means, wherein the third information extracted by the second extraction means includes text data having the same meaning and written in a plurality of languages.

12. The information processing apparatus according to claim 11, wherein the second extraction means extracts a plurality of pieces of third information, and the generation means generates the display data so that the plurality of pieces of third information extracted by the second extraction means are mutually distinguished.

13. The information processing apparatus according to claim 11, further comprising:

second detection means for detecting fourth information indicating attributes of the plurality of languages of the text data included in the third information extracted by the second extraction means; and third extraction means for extracting only text data written in a predetermined language according to the fourth information detected by the second detection means, wherein the generation means generates first display data formed of the text data written in the predetermined language extracted by the third extraction means and second display data formed of text data written in a language other than the predetermined language, and the display means displays a first display screen corresponding to the first display data and when the input means inputs an operation for selecting a predetermined text display on the first display screen the display means displays a second display screen corresponding to the second display data corresponding to the predetermined text.

14. The information processing apparatus according to claim 11, wherein the first information is written in a markup language.

15. An information processing method for displaying information in a plurality of different formats, comprising:

an input control step for receiving an operation input of a user, wherein the operation input of the user includes a selection of one display format from the plurality of display formats;

an acquisition control step of controlling acquisition of first information;

a first extraction step of extracting a selected part from the first information acquired in the acquisition control step according to the operation input of the user received in the input control step;

a detection step of detecting second information included in the selected part of the first information extracted by the first extraction step;

a second extraction step of extracting third information from the selected part of the first information extracted by the first extraction step according to the second information detected by the detection step;

a generation step of generating display data according to the third information based on the one display format selected by the user and of generating sixth information indicating whether a corresponding line is a blank line; and a display control step of controlling the display of the display data generated by the generation step, wherein the third information extracted by the second extraction step includes text data having a same meaning and written in a plurality of languages.

16. A recording medium storing a computer-readable program for programming a computer to display information in a plurality of display formats, the program comprising:

an input control step for receiving an operation input of a user, wherein the operation input of the user includes a selection of one display format from the plurality of display formats;

an acquisition control step of controlling acquisition of first information;

a first extraction step of extracting a selected part from the first information acquired in the acquisition control step according to the operation input of the user received in the input control step;

a detection step of detecting second information included in the selected part of the first information extracted by the first extraction step;

a second extraction step of extracting third information from the selected part of the first information extracted by the first extraction step according to the second information detected by the detection step;

a generation step of generating display data according to the third information based on the one display format selected by the user and of generating sixth information indicating whether a corresponding line is a blank line; and a display control step of controlling display of the display data generated by the generation step, wherein the third information extracted by the second extraction step includes text data having the same meaning and written in a plurality of languages.

17. A program in the form of code residing in a memory of a computer for programming the computer to produce a tangible result in the form of a display of information in a plurality of display formats, comprising:

an input control step for receiving an operation input of a user, wherein the operation input of the user includes a selection of one display format from the plurality of display formats;

an acquisition control step of controlling acquisition of first information;

a first extraction step of extracting a selected part from the first information acquired in the acquisition control step according to the operation input of the user received in the input control step;

a detection step of detecting second information included in the selected part of the first information extracted by the first extraction step;

a second extraction step of extracting third information from the selected part of the first information extracted by the first extraction step according to the second information detected by the detection step;

a generation step of generating display data according to the third information based on the one display format selected by the user and of generating sixth information indicating whether a corresponding line is a blank line; and a display control step of controlling display of the display data generated by the generation step, wherein the third information extracted by the second extraction step includes text data having a same meaning and written in a plurality of languages.

* * * * *